(12) United States Patent
Chui

(10) Patent No.: US 6,347,157 B2
(45) Date of Patent: Feb. 12, 2002

(54) SYSTEM AND METHOD FOR ENCODING A VIDEO SEQUENCE USING SPATIAL AND TEMPORAL TRANSFORMS

(75) Inventor: Charles K. Chui, Menlo Park, CA (US)

(73) Assignee: Picsurf, Inc., Mountain View, CA (US)

( * ) Notice: Subject to any disclaimer, the term of this patent is extended or adjusted under 35 U.S.C. 154(b) by 0 days.

(21) Appl. No.: 09/850,947

(22) Filed: May 7, 2001

Related U.S. Application Data

(63) Continuation-in-part of application No. 09/358,876, filed on Jul. 22, 1999, now Pat. No. 6,229,926.
(60) Provisional application No. 60/094,129, filed on Jul. 24, 1998.

(51) Int. Cl.[7] .............................. G06K 9/36; G06K 9/46
(52) U.S. Cl. .................... 382/240; 382/248; 375/240.19
(58) Field of Search ................................ 382/232, 233, 382/240, 248, 249, 250; 358/432, 433; 375/240.18, 240.19

(56) References Cited

U.S. PATENT DOCUMENTS

| | | | |
|---|---|---|---|
| 5,825,935 A | 10/1998 | Murakoshi | 382/248 |
| 5,867,602 A | 2/1999 | Zandi et al. | 382/248 |
| 5,870,502 A | 2/1999 | Bonneau et al. | 382/249 |
| 5,949,911 A | 9/1999 | Chui et al. | 382/240 |
| 6,069,977 A | 5/2000 | Kim et al. | 382/240 |
| 6,134,350 A | 10/2000 | Beck | 382/240 |
| 6,141,452 A | 10/2000 | Murao | 382/240 |
| 6,141,453 A | 10/2000 | Banham et al. | 382/240 |
| 6,226,414 B1 * | 5/2001 | Go | 382/240 |
| 6,229,926 B1 * | 5/2001 | Chui et al. | 382/240 |
| 6,236,762 B1 * | 5/2001 | Chui et al. | 382/250 |
| 6,246,798 B1 * | 6/2001 | Andrew et al. | 382/240 |

* cited by examiner

Primary Examiner—Bhavesh Mehta
(74) Attorney, Agent, or Firm—Pennie & Edmonds LLP

(57) ABSTRACT

A system and method for compressing a video data stream receives a sequence of video frames, each video frame containing an array of image data representing an image. A spatial transform module performs a spatial decomposition transform on the video frames to generate spatially transformed video frames. A temporal transform module performs a temporal decomposition transform on blocks of the spatially transformed video frames, each block containing a predefined number of the spatially transformed video frames in a sequence corresponding to the sequence of the corresponding video frames. The temporal transform module applies a temporal decomposition transform to at least one low spatial frequency subband of data in the spatially transformed video frames so as to generate temporally transformed video data. A data encoder encodes, for each block of video frames, the temporally transformed video data and the subbands of data, if any, to which the temporal decomposition transform was not applied.

15 Claims, 17 Drawing Sheets

Non-Separable Wavelet Transform

Separable Wavelet Transform, Type 1

Separable Wavelet Transform, Type 2

8 x 8 DCT Array

For l = 1,2,3 bl = bl,i,j $$cl = cl,i,j = \begin{bmatrix} c11 & c12 \\ c21 & c21 \end{bmatrix}$$

$$dl = dl,i,j = \begin{bmatrix} d11 & \ldots & d14 \\ . & \ldots & . \\ d41 & \ldots & d44 \end{bmatrix}$$

32 x 32 Tree Coding Array $$A = \begin{bmatrix} a00 & \ldots & a03 \\ . & \ldots & . \\ a30 & \ldots & a33 \end{bmatrix}$$

$$BI = \begin{bmatrix} bI,00 & \ldots & bI,03 \\ . & \ldots & . \\ bI,30 & \ldots & bI,33 \end{bmatrix} \quad I = 1,2,3$$

$$CI = \begin{bmatrix} cI,00 & \ldots & cI,03 \\ . & \ldots & . \\ cI,30 & \ldots & cI,33 \end{bmatrix}$$

$$DI = \begin{bmatrix} dI,00 & \ldots & dI,03 \\ . & \ldots & . \\ dI,30 & \ldots & dI,33 \end{bmatrix}$$

NQS: Divide Block into Subblocks

404

```
Output MaxBit(h,w,k-1):  / preferred implementation /

Set b = MaxBit(h,w,k-1);
If b=0  {Output B "0" bits}
Else    {Output B-b "0" bits followed by a "1" bit};
```

```
Set repeat-times = 0;
repeat:
  {
  input 1 bit;
  If input bit =1 {
      MaxBit(i,j,k-1) = B - repeat-times;
      Add (i,j,k-1) block to LB;
      Stop repeating;
      };
  If repeat-times = B {
      MaxBit(i,j,k-1) = 0;
      Stop repeating;
      }
  repeat-times = repeat-times + 1;
  }.
```

FIG. 17

SYSTEM AND METHOD FOR ENCODING A VIDEO SEQUENCE USING SPATIAL AND TEMPORAL TRANSFORMS

This application is a continuation-in-part of U.S. patent application Ser. No. 09/358,876 filed Jul. 22, 1999, now U.S. Pat. No. 6,229,926 which claimed priority on U.S. provisional patent application Ser. No. 60/094,129, filed Jul. 24, 1998.

The present invention relates generally to the processing and storage of video images where sequences of video frames must be processed with relatively little memory, and particularly to a system and method for applying a wavelet or wavelet-like transform to a stream of video frames to perform a spatial decomposition transform, and then applying a time domain wavelet or wavelet-like transform to at least the lower spatial frequency coefficients in groups of the decomposed video frames. The time domain (temporal) transforms are performed using an asymmetric, memory efficient transform, without generating undesirable border effects.

BACKGROUND OF THE INVENTION

The digital video data stream for even a few minutes of a video program, if uncompressed, will occupy very large quantities of memory. Numerous methods of video data compression have been used and many others described in publications and the like.

The present invention uses the well known data compression capabilities of decomposition transforms, such as wavelet and wavelet-like transforms, in a new way to improve compression of video data streams. In particular, the inventor has found that the low spatial frequency components of a sequence of video frames are highly compressible using a temporal transform, such as wavelet or wavelet-like transform. However, the inventor has found that the high spatial frequency components of a typical sequence of video frames are often much less compressible than the low frequency components. The present invention is designed to make use of these properties of typical video data streams so as to achieve very good data compression, while using reasonable computational resources.

Another aspect of the present invention concerns how to best perform a temporal wavelet or wavelet-like transform on a sequence of video frames. It is not practical to perform a temporal transform on a sequence of video frames of unlimited length due to the working memory required for storing the video frames. Thus, the video frames must be processed in batches or blocks, such as blocks of 4, 8, 16, 32 or 64 sequential frames. A sequence of N/2 interleaved frames may be treated as a sequence of N frames, with the odd and even lines of an interleaved frame being treated as two sequential frames. However, to take full advantage of the temporal properties of a sequence of video frames, the inventor has found that it is advantageous while processing one block of video frames to take into account low spatial frequency properties of the previous block of video frames that continue into the current block. Also, the temporal transform should, ideally, be performed so that upon reconstruction of the video frames, abrupt discontinuities between neighboring video frames (i.e., discontinuities not present in the original video frames) are avoided, while also avoiding the working memory requirements of processing a much longer sequence of video frames than the sequence found in any one block of video frames.

Further, it would be advantageous for the temporal decomposition transform to be compatible with a variety of different spatial decomposition transforms applied to the individual video frames. In other words, regardless of whether the individual video frames are decomposed using DCT, or a wavelet or wavelet-like transform, the temporal decomposition transform should be helpful in improving data compression.

SUMMARY OF THE INVENTION

In summary, the present invention is a system and method for compressing and encoding a stream of digital video frames. The system and method receives a sequence of video frames, each video frame containing an array of image data representing an image. A spatial transform module performs a spatial decomposition transform on the individual video frames to generate spatially transformed video frames. Each of the spatially transformed video frames includes a plurality of subbands of data, including at least one low spatial frequency subband of data A temporal transform module performs a temporal decomposition transform on blocks of the spatially transformed video frames. Each block contains a predefined number of the spatially transformed video frames in a sequence corresponding to the sequence of the corresponding video frames. The temporal transform module applies a temporal decomposition transform to at least one low spatial frequency subband of data in the spatially transformed video frames so as to generate temporally transformed video data. The temporal decomposition transform is an asymmetric transform that extends beyond a current block of spatially transformed video frames to a trailing edge of a previous block of spatially transformed video frames, but does not extend beyond the current block of spatially transformed video frames into a next block of spatially transformed video frames.

A data encoder encodes, for each block of video frames, the temporally transformed video data and the subbands of data, if any, of the spatially transformed video frames in the block to which the temporal decomposition transform was not applied.

In a preferred embodiment, the temporal decomposition transform is a wavelet or wavelet-like decomposition transform. The at least one low spatial frequency subband includes, for each video frame, a plurality of coefficients at positions (i,j). The temporal decomposition transform includes a plurality of transform layers, including first, second and last transform layers. Each of the plurality of transform layers other than the last transform layer produce intermediate coefficients for input to a next transform layer.

An edge data buffer is used to store, for each coefficient in the at least one low spatial frequency subband, at least one intermediate coefficient generated by the temporal decomposition transform when applied to the previous block of video frames. The temporal transform uses the at least one intermediate coefficient stored in the edge buffer, corresponding to each coefficient in the at least one low spatial frequency subband, as input to at least one of the transform layers of the temporal decomposition transform when the temporal decomposition transform is applied to the current block of video frames.

BRIEF DESCRIPTION OF THE DRAWINGS

Additional objects and features of the invention will be more readily apparent from the following detailed description and appended claims when taken in conjunction with the drawings, in which:

FIG. 15 is a flow chart of a preferred implementation of the "MaxBit" function used by the "nested quadratic splitting" (NQS) data encoding method that is represented by the flow chart in FIG. 14.

FIG. 17 is a flow chart of a procedure for decoding MaxBit values in a compressed image block file.

DESCRIPTION OF THE PREFERRED EMBODIMENTS

In this document, the term "wavelet transform" is used to mean either a wavelet or wavelet-like transform or filter. A wavelet-like transform typically is implemented as a short FIR filter, making application of the transform to a set of data computationally efficient. The wavelet-like transforms used in the present invention are preferably lossless transforms, which are losslessly reversible. When a wavelet-like transform is used in conjunction with quantization of the coefficients generated by the wavelet-like transform, the transform is no longer lossless, but data compression is improved.

In this document, the terms "inverse transform" and "reconstruction transform" mean the same thing. In the present invention inverse transforms are used to reconstruct data, such as spatial transform coefficients or image data.

A "block" is used in this document to refer to a block of sequential video frames. A block, for instance, may include a set of sixteen video frames. The number of frames in a block will vary from one implementation to another and may range from as few as eight frames and to as many as 128 frames; however, using circa 2001 technology, the number of video frames per block is expected to most often be sixteen or thirty-two.

The term "working memory" is used in this document to mean high speed random access memory or other memory suitable for storing data whose value is being modified by computations. Working memory is contrasted with other forms of memory, such as read only memory, disk storage and memory with update times too slow for use in computations.

The present invention may be implemented in a variety of devices that process images, including a variety of computer systems, ranging from high end workstations and servers to low end client computers, as well as in application specific dedicated devices, such as digital video cameras, personal computers, and world wide web access devices with video capabilities.

Video sequences includes progressive video sequences and interleaved video sequences. In a preferred embodiment, when the video sequence to be encoded is an interleaved video sequence, each group or sequence of N/2 interleaved frames is be treated as a sequence of N frames, with the odd and even lines of each interleaved frame being treated as separate, sequential frames.

System for Encoding and Distributing Video Data

Figure 1:
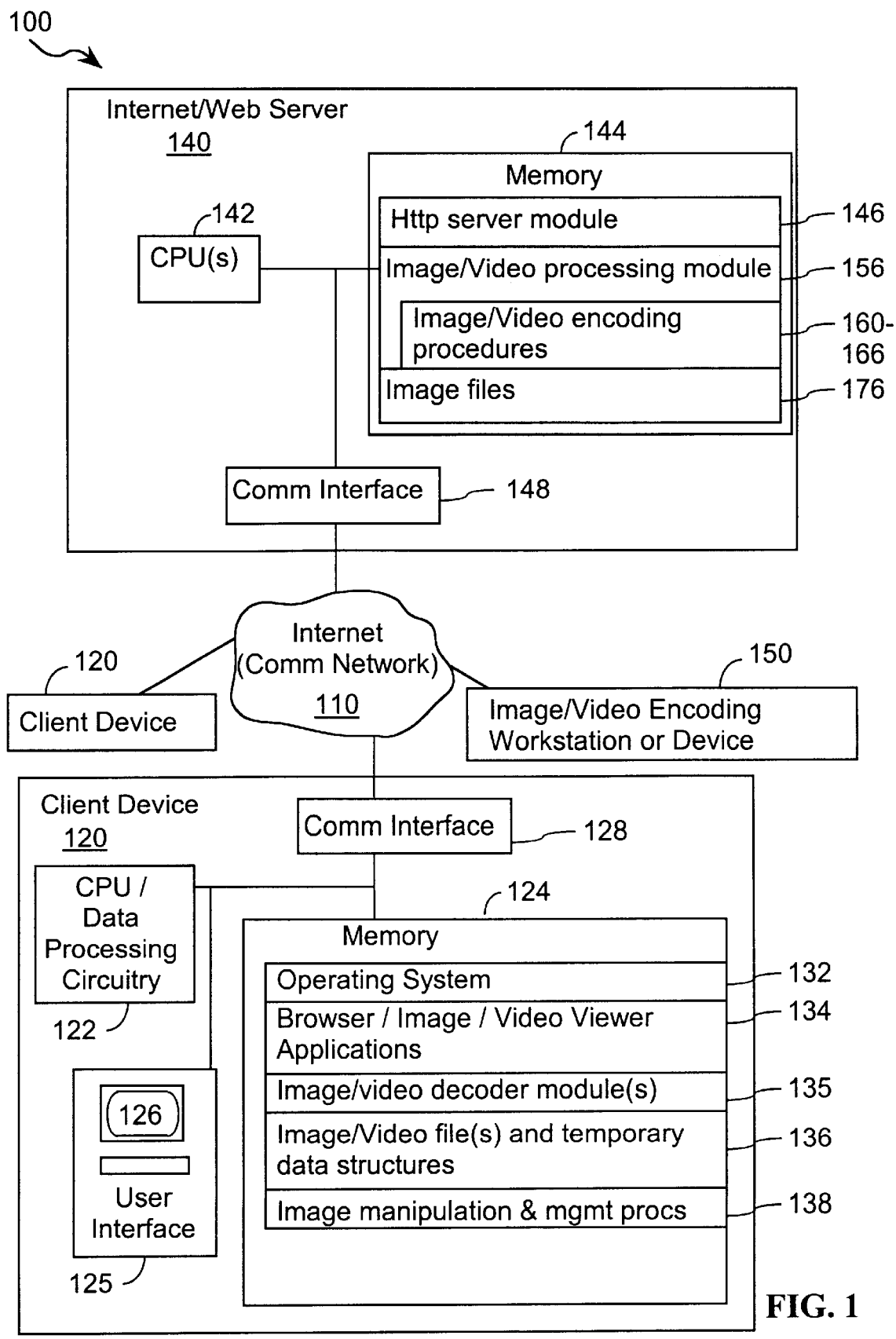
FIG. 1 is a block diagram of a video data distribution stream in accordance with an embodiment of the present invention.

FIG. 1 shows a distributed computer system, including a web or application server 140 and a number of client computers 120, for distributing images and video data (i.e., image and video files) to the client computers via a communications network 110, such as the Internet, a wired and/or a wireless telephone network, or any other appropriate communications network, such as a local area network or Intranet. An image/video encoding workstation or device 150 prepares image and video files for distribution by the server 140. In some embodiments, the server 140 may also perform the image and video encoding tasks of the image/video encoding workstation 150.

A typical client device 120 is a desktop or personal computer, or a set top box used in conjunction with a television or other display device.

The client device 120 will preferably include a central processing unit 122, memory 124 (including high speed random access memory, and non-volatile memory such as flash memory or disk storage), a user interface 125 including a display screen 126, and a network interface or other communications interface 128 for connecting the client device to the web or application server 140 via the communications network 110. The memory 124 will typically store an operating system 132, a browser application or other image and video viewing application 134, one or more image/video decoder modules 135, and image/video files and temporary data structures 136 for use when decoding those files and/or manipulating images and video data. The memory 124 may also optionally include image/video manipulation and management procedures 138, such as procedures for rotating images, overlaying images, and so on.

The web or application server 140 will preferably include a central processing unit (CPU) 142, memory 144 (including high speed random access memory, and non-volatile memory such as disk storage), and a network interface or other communications interface 148 for connecting the server to client devices and to the image/video encoding workstation 150 via the communications network 110. The memory 144 will typically store an http server module 146 for responding to http requests, including request for image and/or video files 190. Alternately, the memory 144 may store a server module that uses a protocol other than http, and that responds to requests for information and/or images. The server 140 may optionally include an image processing module 168 with encoding procedures 172 for encoding images and/or video data.

Video Capture and Encoding System

Figure 2:
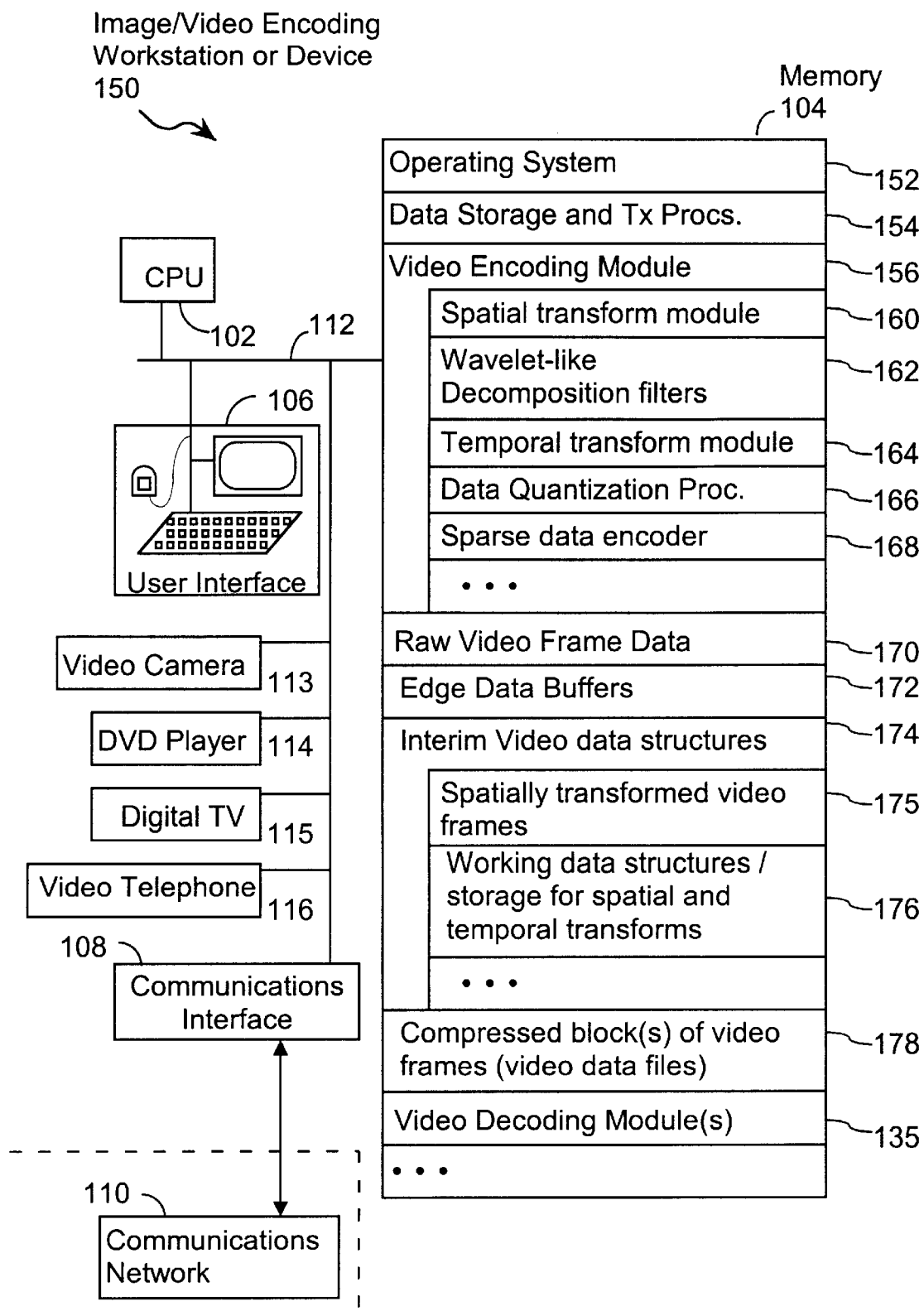
FIG. 2 is a block diagram of a video data encoding workstation.

Referring to FIG. 2, a video encoding system workstation or device 150 includes, or is coupled to a source of video frames, such as a video camera 113, DVD player 114, digital television receiver 115, video telephone 116 or other video source. The workstation 150 one or more central processing units (CPU) 102, memory 104 (including high speed random access memory, and non-volatile memory such as disk storage), a user interface 106, a network interface or other communications interface 108 for connecting the workstation to servers 140 and/or client devices 120 via the communications network 110, all interconnected by one or more system busses 112.

The memory 104 typically stores an operating system 152, data storage and transmission procedures 154, and a video encoding module 156. The video encoding module 156 preferably includes a spatial transform module 156 for applying a spatial transform, such as sequence of wavelet or wavelet-like transforms or a DCT transform, to a video frame to generate a decomposed video frame;

transform filters 162, such as wavelet-like decomposition filters, also called transforms or transform functions, for use by the both the spatial transform module 156 and the temporal transform module 164; in some embodiments the transform filters 162 include a DCT decomposition filter;

a temporal transform module 164 for performing a temporal decomposition of data from a sequence of video frames;

a data quantization procedure 166, for quantizing coefficients produced by the spatial and temporal transform modules; and a sparse data encoder 168 for encoding blocks of data, such as the coefficients produced by the spatial and temporal transform modules.

The memory 104 is also used to store raw video frame data 170, for processing by the spatial transform module 160;

edge data buffers 172 for storing intermediate edge coefficients generated by the temporal transform module while processing a block of video frames and for use the temporal transform module processes the next block of video frames;

interim video data structures 174 for storing intermediate values generated by the spatial transform module and temporal transform module, including spatially transformed video frames 175 and working storage and data structures 176 used while performing the spatial and temporal transforms;

video data files 178, which store compressed blocks of video frames; and optionally, a video data decoding module 135 for reconstructing blocks of video frames from the compressed video data in the video data files 178.

Overview of Processing of Block of Video Frames

Figure 3:
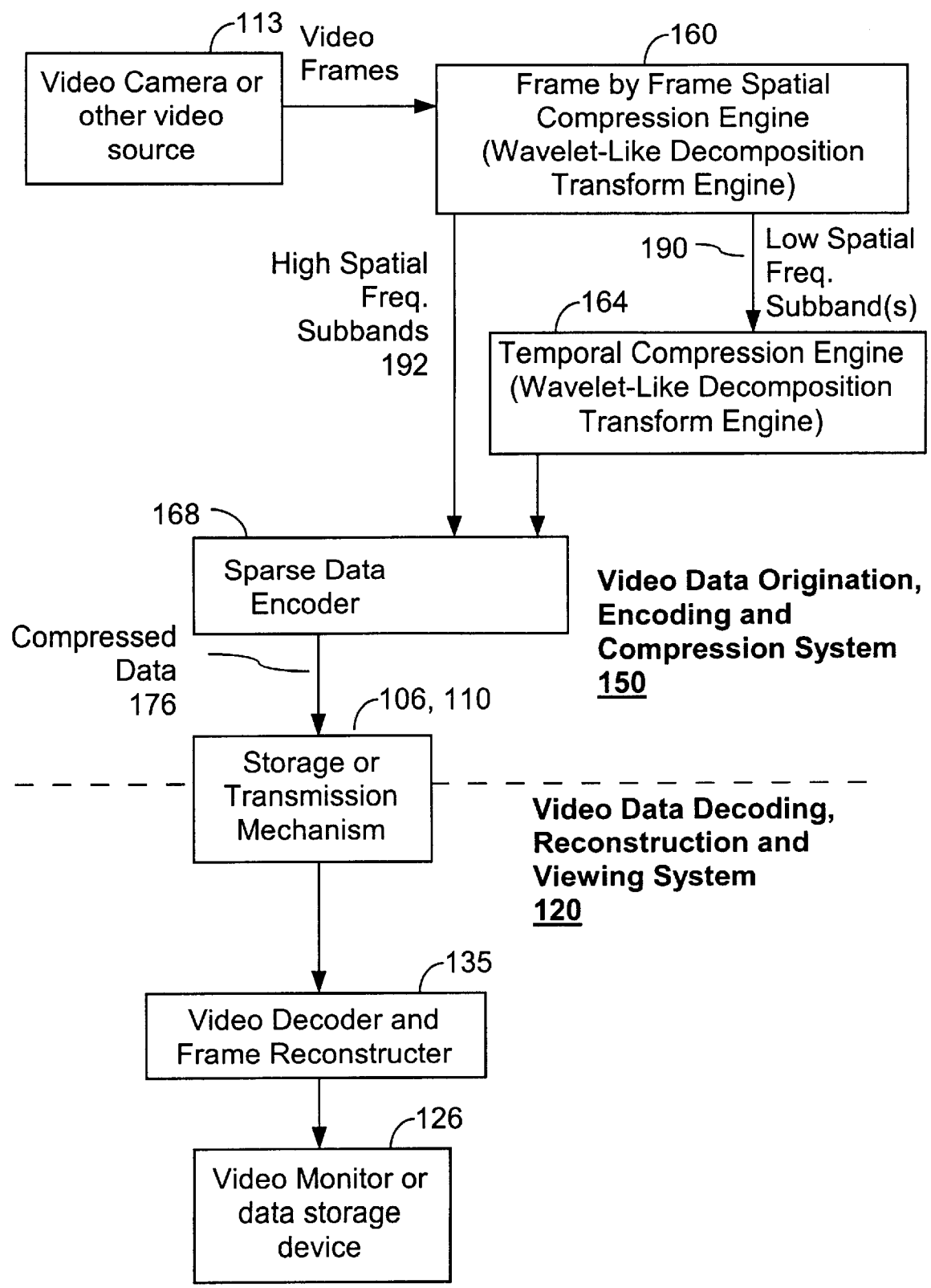
FIG. 3 schematically depicts a process of transforming video data for a stream of video frames.
Figure 4:
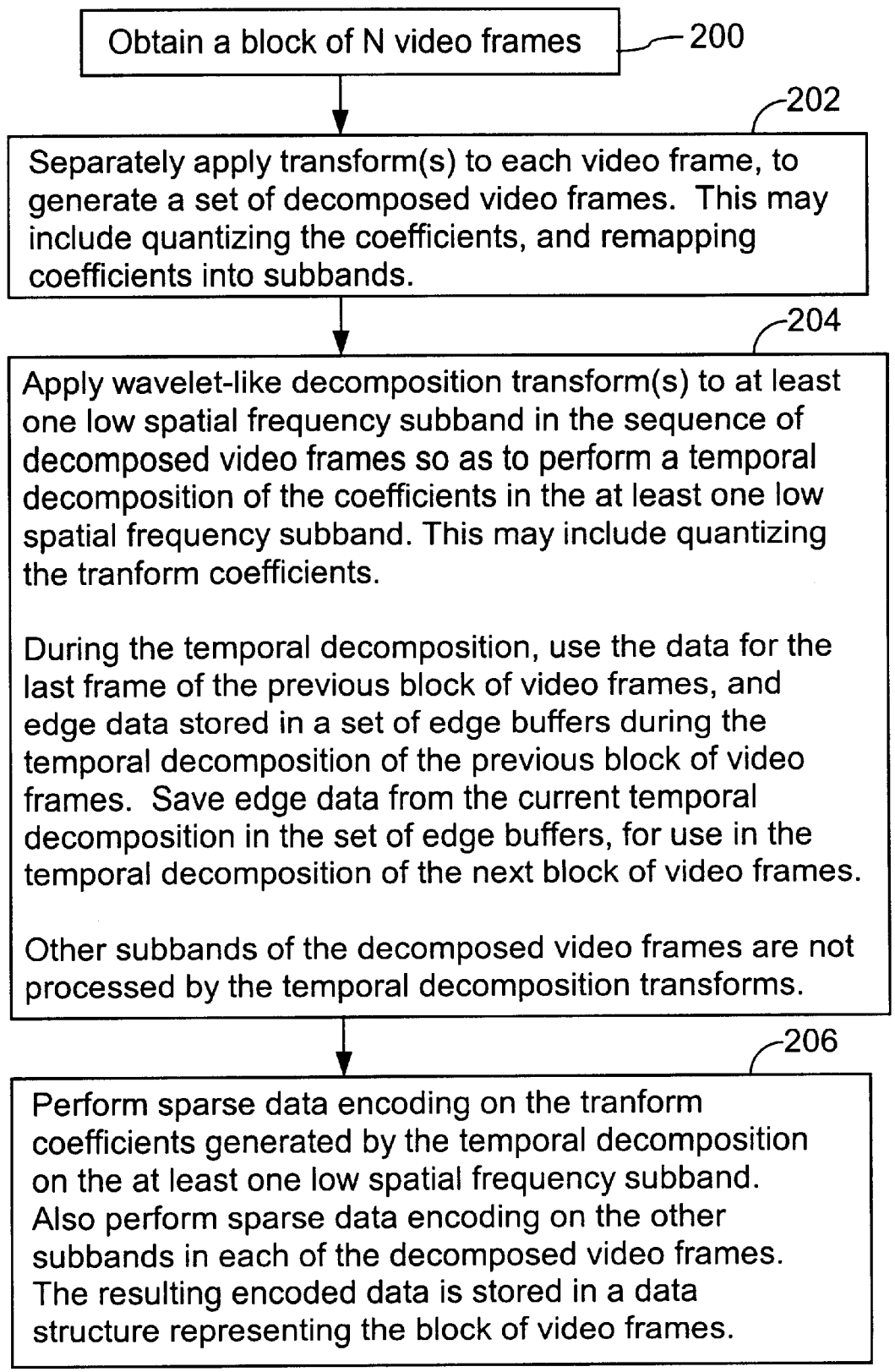
FIG. 4 is a high level flow chart of a spatial and temporal transform process in accordance with the present invention.

Referring to FIGS. 3 and 4, video frames are received from a video camera 113 or other video source, such as a DVD or other video player, or even from a unknown remotely located device (step 200). As mentioned above, if the video frames received are frames having interleaved odd and even lines, the odd lines are treated as one frame and the even lines are treated as a next frame. The individual video frames are subjected to a spatial transform 160 (step 202), which enables the data in each frame to be substantially compressed. In the preferred embodiments, the spatial transform used is a multi-layer wavelet transform, a multi-layer wavelet-like transform, or the discrete cosine transform (DCT). DCT may be used as the spatial transform, for instance, in systems that produce "full motion JPEG" encoded video frames. One example of a set of wavelet-like transforms is described in some detail below.

In one preferred embodiment, the decomposition coefficients generated by the application of the spatial transform to each video frame are quantized to improve data compression, and are organized into spatial frequency subbands. The number of subbands depends on the spatial transform used.

A temporal decomposition transform 164 is applied to the coefficients in one or more of the subbands of decomposition coefficients for each block of video frames (step 204). Preferably, the temporal decomposition transform is a wavelet-like transform that is applied to the lowest spatial frequency subband or subbands of the decomposition coefficients for each block of video frames. This will be explained in more detail below. Zero or more of the higher spatial frequency subbands of the decomposition coefficients for each block of video frames are not processed by the temporal decomposition transform. In other words, the temporal decomposition transform may be applied to all the subbands of decomposition coefficients, but in some embodiments the temporal decomposition transform is applied to only the lowest spatial frequency subbands of decomposition coefficients. The reason for this, as explained above, is that the inventor has found that use of the temporal decomposition transform significantly improves data compression of the low spatial frequency coefficients, but often does not significantly improve data compression of the higher spatial frequency coefficients.

The decomposition coefficients generated by the temporal decomposition transform, and the decomposition coefficients in the higher spatial frequency bands not processed by the temporal decomposition transform are efficiently encoded using a sparse data encoder 168 (step 206). The resulting encoded, compressed data is stored in a file or other data structure. To achieve better data compression, the decomposition coefficients generated by the temporal decomposition transform are quantized prior to their being encoded. In applications where image quality is paramount, the decomposition coefficients generated by the temporal decomposition transform are either not quantized, or are quantized using a smaller quantization factor than used for lower image quality applications.

Details of wavelet-like transforms used in a preferred embodiment are described in detail below. Circuitry for performing the wavelet-like transform of the preferred embodiment is very similar to the wavelet transform and data quantization methods described in U.S. Pat. No. 5,909,518, "System and Method for Performing Wavelet and Inverse Wavelet Like Transformations of Digital Data Using Only Add and Bit Shift Arithmetic Operations," which is hereby incorporated by reference as background information.

The sparse data encoding method of the preferred embodiment is called Nested Quadratic Splitting (NQS). This sparse data encoding method is either the NQS sparse data encoding method described in U.S. Pat. No. 5,949,911, entitled "System and Method for Scalable Coding of Sparse Data Sets," which is hereby incorporated by reference as background information, or an improved version. For instance, the method described in U.S. Pat. No. 5,949,911 maybe modified or improved by as disclosed in U.S. patent application Ser. No. 09/687,467, filed Oct. 12, 2000, which is hereby incorporated by reference as background information. One preferred embodiment of a sparse data encoding method is described below with reference to FIGS. 13A, 13B and 14–17.

Figure 5A:
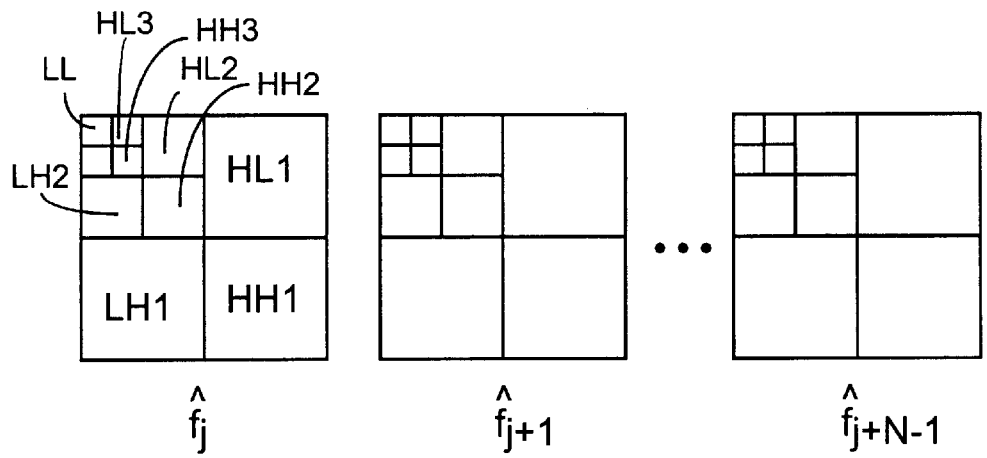
FIGS. 5A, 5B, 5C and 5D depict a sequence of video frames to which different spatial decomposition transforms have been applied.

FIGS. 5A through 5D show four examples of spatial decomposition of a sequence of video frames. In the first example, shown in FIG. 5A, the spatial decomposition transform applied to each video frame is a "Mallat" style wavelet-like transform, which means that a wavelet-like filter is alternately applied horizontally and vertically. Each time the filter or transform is applied both horizontally and vertically is called a layer, and the number of layers used depends in large part on the size of the frame. For frames having sizes comparable to 512×512 pixels, six or seven transform layers may be used, while smaller numbers of layers are likely to be used for smaller frames. FIG. 5A shows the subbands of coefficients generated by applying just three transform layers, but this is only for purposes of illustration.

Figure 5B:
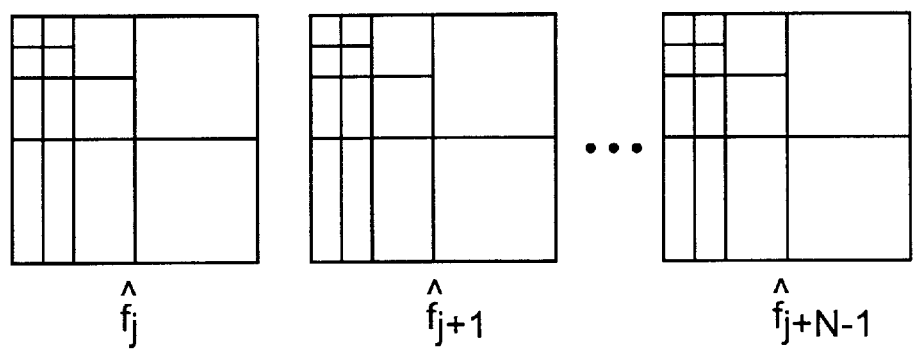

FIG. 5B shows an example of the subbands of coefficients generated by applying a first type of "separable" wavelet-like transform to each of a set of video frames. In this example several layers of a wavelet or wavelet-like transform are applied first in a first dimension, such as horizontally, and then several layers of the wavelet or wavelet-like transform are applied first in a second dimension, such as vertically. Each successive layer is applied to only half as many input values as the previous layer. Also, when the first layer of the wavelet or wavelet-like transform is applied in the second dimension, it is only applied against the lower half (shown on the left) of the spatial frequency coefficients generated by the first layer of the transform when applied in the first dimension.

Figure 5C:
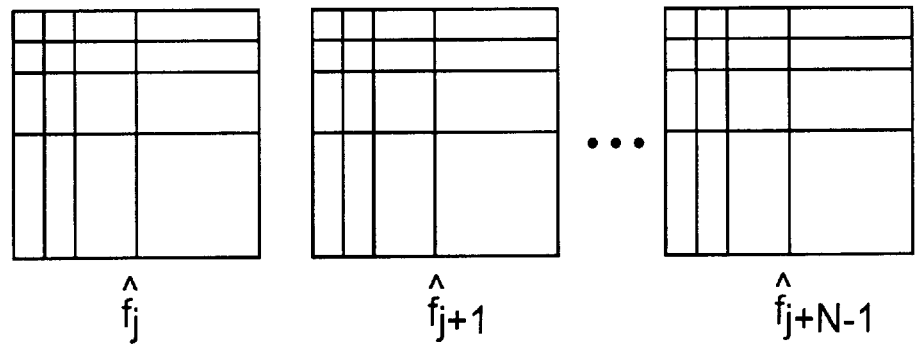

FIG. 5C shows an example of the subbands of coefficients generated by applying a second type of "separable" wavelet-like transform to each of a set of video frames. The only difference between this example and the example in FIG. 5B is that when the first layer of the wavelet or wavelet-like transform is applied in the second dimension, it is applied against the entire set of coefficients generated by the layers of the transform applied in the first dimension.

Figure 5D:
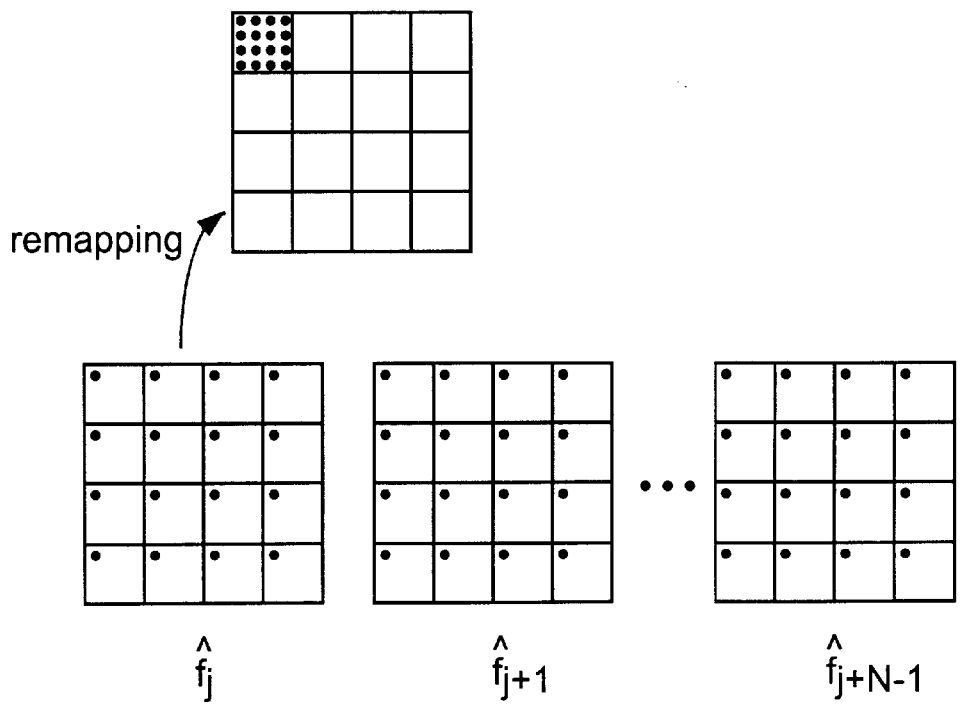

FIG. 5D shows an example of the coefficients generated by applying a discrete cosine transform (DCT) against each video frame. The DCT generates 8×8 blocks of coefficients, with a DC term in the upper left corner of each 8×8 block. As shown in FIG. 5D, the DC terms maybe remapped to a contiguous block of the transformed video frame. Other DCT coefficients of the transformed video frame may be remapped into contiguous blocks of their own. In particular, the DCT coefficients representing the low spatial frequency components of each 8×8 block of the image are preferably mapped into contiguous blocks of locations, each block forming a subband.

Figure 5E:
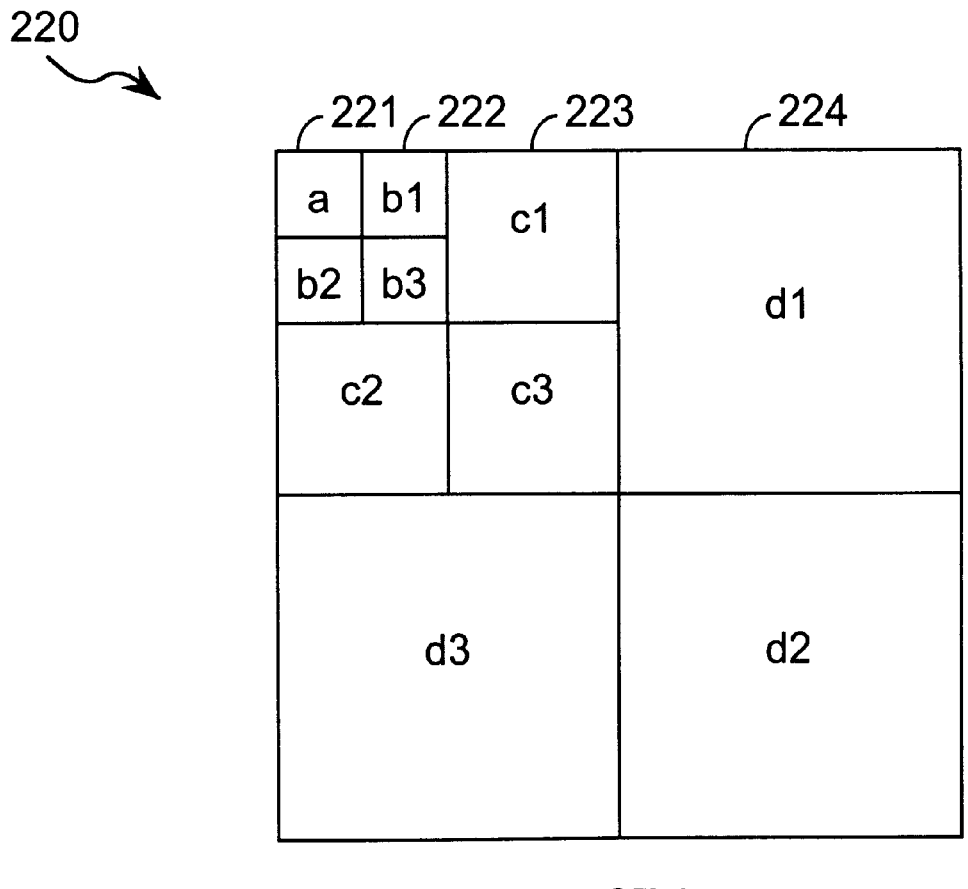
FIGS. 5E and 5F depict a remapping of DCT coefficients from sixteen 8×8 DCT blocks into a 32×32 block having a set of spatial frequency subbands.
Figure 5F:
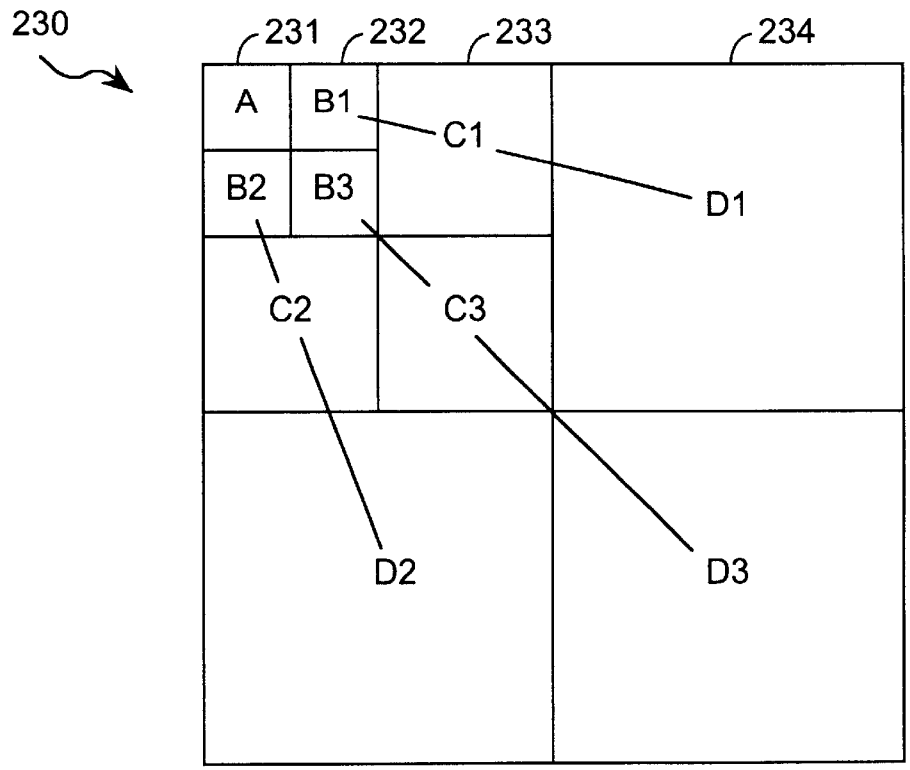

FIGS. 5E and 5F depict one example of a remapping of DCT coefficients from sixteen 8×8 DCT blocks into a 32×32 block having a set of spatial frequency subbands. When a video frame has been transformed using DCT, the coefficients in each DCT array 220 may be classified as illustrated in FIG. 5E. Section "a" 221 is comprised of a single coefficient. Section 222 is comprised of three blocks labeled b1–b3 each containing a single coefficient. Section 223 is comprised of three 2×2 blocks labeled c1–c3, and section 224 is comprised of three 4×4 blocks labeled d1–d3.

A set of sixteen 8×8 DCT arrays are mapped into a new 32×32 array 230 illustrated in FIG. 5F. However, other embodiments can use remapped arrays of different sizes. For instance, a 16×16 remapped array would include just four 8×8 DCT arrays, while a 64×64 remapped array would include sixty-four 8×8 DCT arrays.

The upper leftmost coefficient "a" 231 in DCT array 220, is referred to as the DC coefficient. All the other coefficients in the DCT array are AC coefficients. The DC coefficients from all sixteen DCT arrays in the analysis array are mapped in raster scan order into section 231, which consists of a single 4×4 block labeled "A." Similarly each of the coefficients in all of the DCT arrays in the position of the block labeled "b1" in section 222 of DCT array 220, are mapped in raster scan order into the B1 block of section 232 of tree coding array 230. The b2 coefficients and b3 coefficients are similarly mapped into the B2 and B3 blocks. This mapping process is then also applied to the c1, c2, and c3 blocks, which are mapped in raster scan order into the C1, C2 and C3 blocks 233. The C1, C2 and C3 blocks are each 8×8 blocks. The c1, c2 and c3 blocks each consist of 2×2 groups of coefficients. These 2×2 groups are mapped as a unit. The C1–C3 blocks are thus each an 8×8 block consisting of sixteen 2×2 groups. The same process is also applied at the next level to generate section 234, which consists of three 16×16 blocks D1–D3. The d1–d3 blocks are each 4×4 groups of coefficients, and these groups are mapped in raster scan order into the D1–D3 blocks respectively. Each of the blocks A, B1 to B3, C1 to C3 and D1 to D3 may be considered to be a subband, and may be treated similarly to the subbands generated by wavelet and wavelet-like decomposition transforms.

Memory Efficient Temporal Transform

Figure 6:
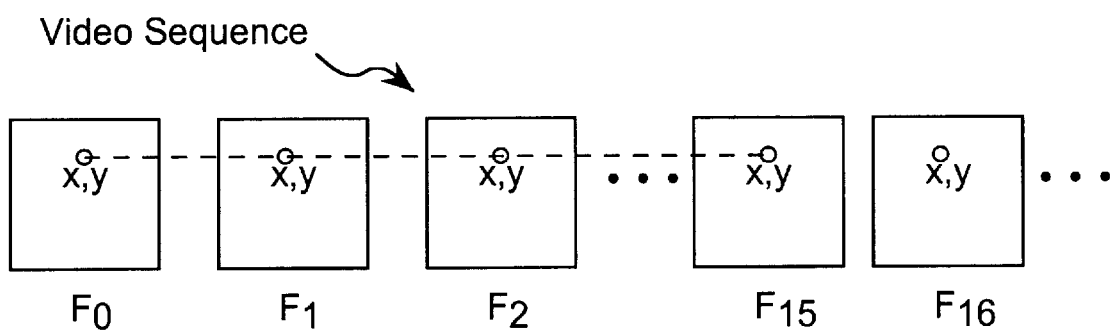
FIGS. 6 and 7 schematically depict a block of video frames to which a temporal decomposition transform will be applied.
Figure 7:
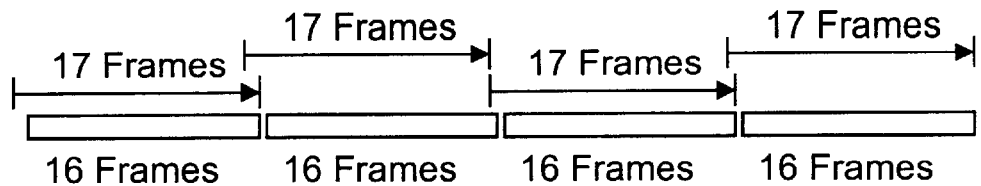

Referring to FIGS. 6 and 7, once the frames in a block of N frames (e.g., 4, 8, 16, 32 of 64 frames) have been transformed by a spatial decomposition transform, the next step is to perform a temporal decomposition transform on each set of N coefficients for a particular coefficient position (i,j). To provide a smooth transition between blocks of frames, while minimizing the amount of data to be kept in working memory, the temporal decomposition transform preferably uses transform data only from the current block of frames plus transform data from the last frame of the previous block. Thus, the temporal decomposition transform for a current block of video frames is preferably applied to the spatial decomposition coefficients of N+1 frames, including the last frame of the previous block for frames.

Furthermore, since the temporal decomposition transform is a multi-layer transform, intermediate temporal decomposition coefficients generated from the previous block of frames are needed to ensure that a smooth transition between blocks of video frames for the temporal decomposition transform layers after the first such transform layer. This will be explained in more detail next with respect to FIG. 8.

Figure 8:
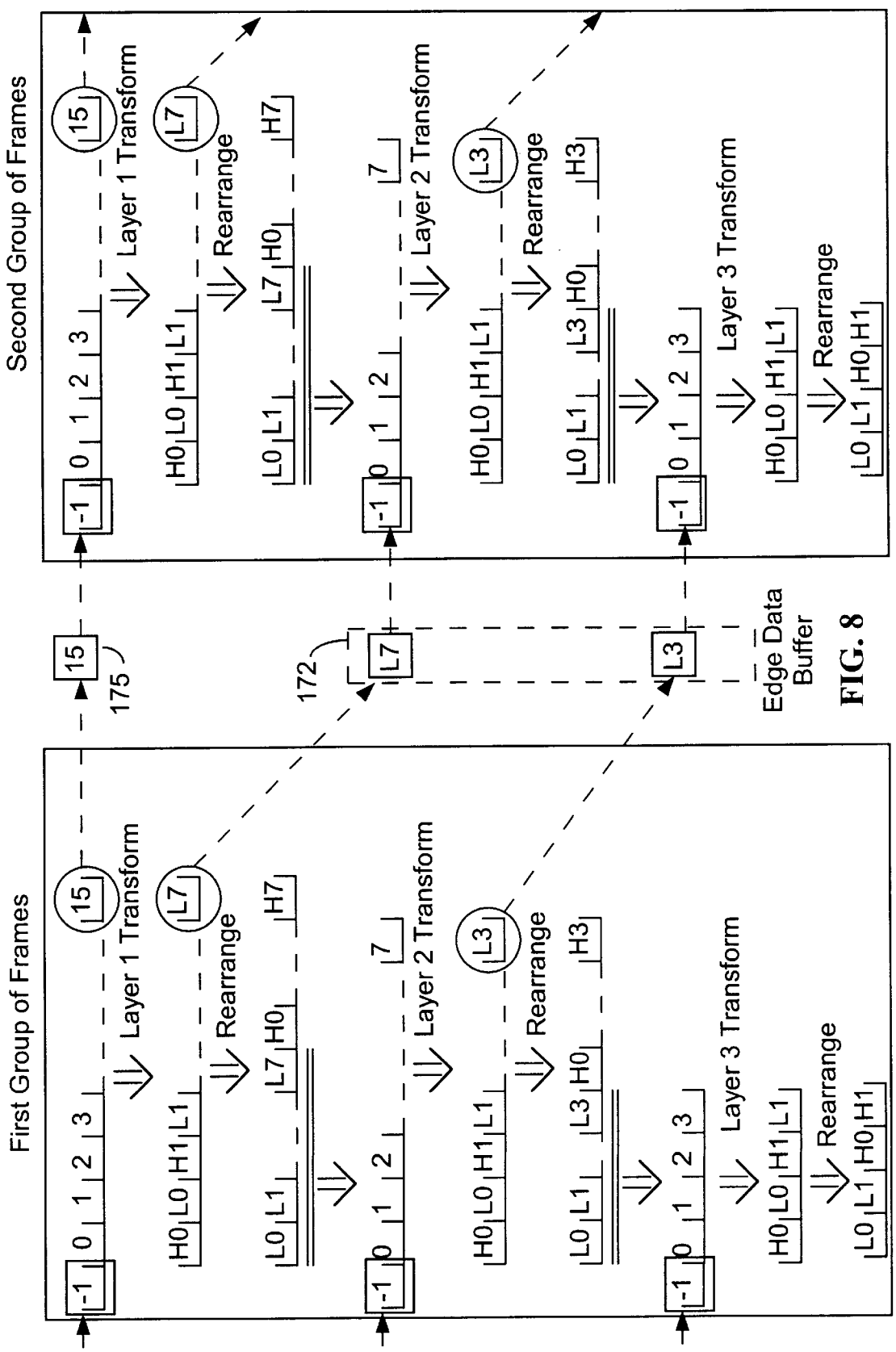
FIG. 8 depicts the application of a temporal transform to two blocks of video frames and the use of an edge data buffer to store edge coefficients generated during the temporal transform of the first block of video frames and used as input during the temporal transform of the second block of video frames.
Figure 9A:
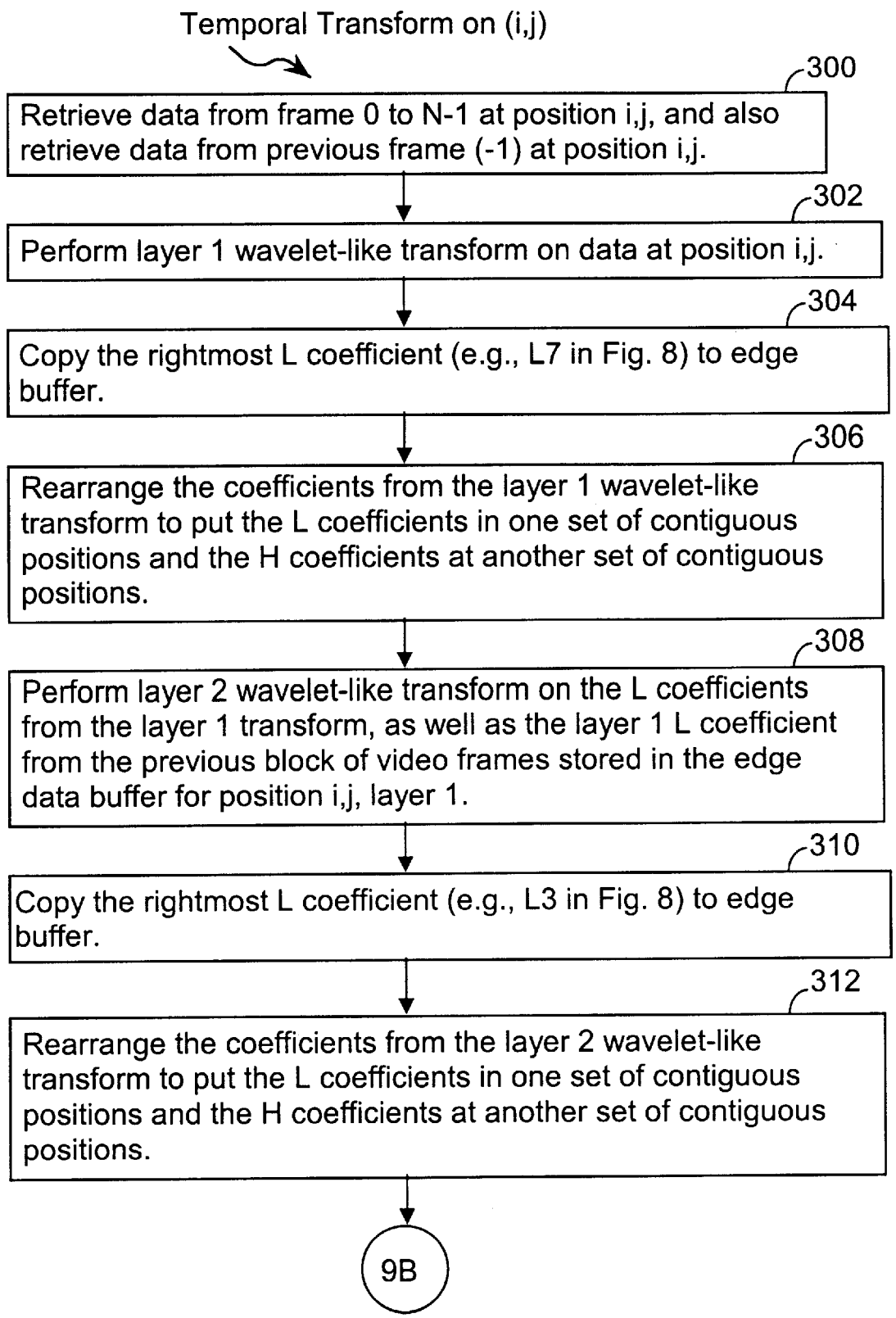
FIGS. 9A and 9B depict a flow chart of a memory efficient temporal decomposition procedure.
Figure 9B:
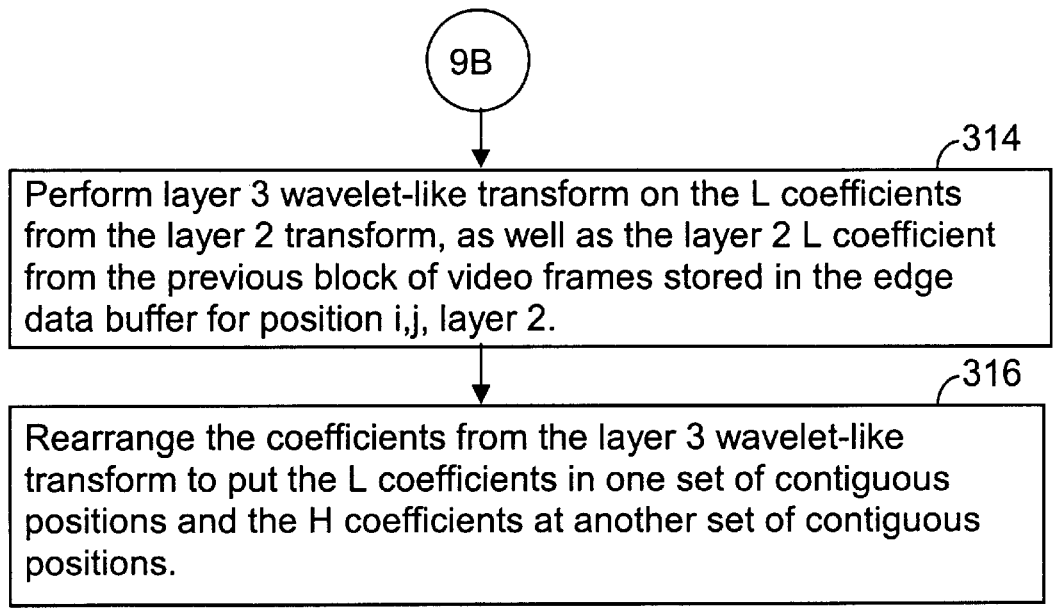

Referring to FIG. 8, at the top left side of the figure the spatial decomposition coefficients for one position (i,j) in a block of N=16 frames are shown, along with the (i,j) coefficient for the last frame of a previous block of frames. Referring to FIGS. 8, 9A and 9B, this data is retrieved from the interim data structures 175 used to store spatially transformed video frames (step 300). A layer 1 transform is applied to that data producing the temporal transform coefficients (L0 to L7 and H0 to H7) shown at the second line of the lefthand box of FIG. 8 (step 302). Those coefficients, initially interleaved, are rearranged (step 306) to place the low frequency coefficients in one contiguous group and the high frequency coefficients in another contiguous group, as shown in the third line of the lefthand box of FIG. 8. The last of the low frequency coefficients, L7, is stored in an edge data buffer 172 (step 304) for use when processing the next block of video frames.

Next, referring to the fourth line of the left box of FIG. 8, a layer 2 transform is applied to the low frequency coefficients (L0 to L7) produced by the layer 1 transform, as well as the L7 coefficient (labeled "−1" in the Figure) from the layer 1 transform of the prior block of video frames (step 308). This produces a set of layer 2 coefficients L0 to L3 and H0 to H3, which are initially interleaved and then rearranged into two contiguous groups (312), and shown in lines 5 and 6 of the left box of FIG. 8. The last of the low frequency coefficients, L3, produced by the layer 2 transform is stored in the edge dat buffer 172 (step 310) for use when processing the next block of video frames.

Then a layer 3 transform is applied to the low frequency coefficients (L0 to L3) produced by the layer 2 transform, as well as the L3 coefficient (labeled "−1" in the Figure) from the layer 2 transform of the prior block of video frames (314). This produces a set of layer 3 coefficients L0, L1, H0, H1, which are rearranged into two contiguous groups (316), as shown in the last two lines of the left box of FIG. 8.

The process shown in the left box of FIG. 8 is performed on all the coefficient positions (i,j) within a predefined set of low spatial frequency subbands produced by the spatial transform that was applied to each of the video frames. Alternately, the process shown in FIG. 8 may be performed on all the coefficient positions produced by the spatial transform of the video frames. The processing of the second block of frames shown in FIG. 8 is the same as the process for the first block of frames. The transfer of edge coefficients, via the edge data buffer, from one block of video frames to the next is shown diagrammatically in FIG. 8.

Wavelet-Like Decomposition Transform Filters

In a preferred embodiment, the wavelet-like decomposition and reconstruction temporal transform filters are asymmetric, extending over the video block boundary on a first side, but not extending over the video block boundary on a second side. More specifically, in the preferred embodiment the wavelet-like transform that is applied is actually two filters. A first filter, T1, is used to generate the first two and last three coefficients in the row of transform coefficients that are being generated, and a second filter T2, is used to generate all the other coefficients in the row of transform coefficients being generated. More generally, a short filter T1 is used to transform data near the edges of the data, while a longer filter T2 is used to transform the data away from the edges of the data. Further, the short filter is preferably asymmetric, so that when it is applied to one edge is does not use data from outside the block of video frames, while for the opposite edge it does use data from outside the block of video frames. The T1 and T2 decomposition filters are defined as follows:

T1 TRANSFORM (ShortFilter)

$$\tilde{x}_{2i} = x_{2i} - \frac{x_{2i-1} + x_{2i+1}}{2} \quad \text{High Freq}$$

$$\tilde{x}_{2i+1} = x_{2i+1} + \frac{\tilde{x}_{2i+2} + \tilde{x}_{2i}}{4} \quad \text{Low Freq}$$

$$\tilde{x}_{2i+1} = x_{2i+1} + \frac{\tilde{x}_{2i}}{4} \quad \text{Low Freq: Last } \tilde{x}_{2i+1} \text{ only}$$

T2 TRANSFORM (LongFilter)

$$\tilde{x}_{2i} = x_{2i} - \frac{x_{2i-1} + x_{2i+1}}{2} - \frac{(x_{2i-1} + x_{2i+1}) - (x_{2i-3} + x_{2i+3})}{16} \quad \text{High Freq}$$

$$\tilde{x}_{2i+1} = x_{2i+1} + \frac{\tilde{x}_{2i+2} + \tilde{x}_{2i}}{4} + \frac{(\tilde{x}_{2i} + \tilde{x}_{2i+2}) - (\tilde{x}_{2i-2} + \tilde{x}_{2i+4})}{32} \quad \text{Low Freq}$$

The T1 decomposition transform is used to generate the coefficients at the edges (i.e., the first two and last three coefficients in the sequence) because it requires only one value outside the video block being processed, while the T2 decomposition transform would require more values outside the video block being processed because of the wider range of data being processed. In the equations above, the x values represent the input data (i.e., spatial decomposition transform coefficients) to which the decomposition transform is being applied, and the $\tilde{x}$ values represent the computed transform coefficients.

The wavelet-like decomposition transform is typically applied to all the (i,j) data sets within an identified set of the subbands of the spatially decomposed frames in the video block. Further, during each layer of the decomposition process, the coefficients at the even positions (i.e., the $\tilde{x}_{2i}$ values) must be computed before the coefficients at the odd positions (i.e., the $\tilde{x}_{2i+1}$ values).

In an alternate embodiment, the short T1 decomposition transform is used to filter all data, not just the data at the edges. Using only the short T1 decomposition transform reduces computation time and complexity. This also reduces the computation time to decode an image file that contains an image encoded using the present invention, because only the corresponding short T1 reconstruction transform (described below) is used during image reconstruction.

The wavelet-like decomposition transform represented by the T1 and T2 filter equations shown above is also used in a preferred embodiment as the spatial decomposition transform. That is, a first layer of this transform is applied horizontally and vertically to the image data in each video frame. Additional layers of the transform are applied to the low frequency coefficients generated by previous layers of the transform.

Referring to FIG. 8 and to the T1 and T2 filter equations shown above, the transform will be explained with reference to a horizontal application of the T1 and T2 transform filters. FIG. 8 shows, for each of three successive transform layers, a before and after representation of the data stored in one row of the main array and in one corresponding element of the prior column array—that is before and after the transform layer is performed.

In each transform layer the two leftmost coefficients (H0 and L0) as well as the three rightmost coefficients are generated using the T1 filter. Note that the rightmost L coefficient is generated using a special version of the T1 filter used only for generating the last L coefficient of each row or column. As a result, the leftmost H coefficient is computed using the data from the current video block and the previous video block. To generate the leftmost L coefficient, the T1 filter does not require any data from outside the current video block, except that it uses the leftmost H coefficient (H0) as an input and the H0 value depends on data from the previous the video block, if any. For the rightmost H and L coefficients, the T1 filter does not use any data outside the current block of video frames.

The T2 transform filter is used to compute all the other coefficients away from the edges of the video block. Since these coefficients are not positioned along the edge of the video block, the data values used as input to this filter fall within the current video block. More specifically, the input data values to the filter range from three positions to the left to three positions to the right of the coefficient being generated. Depending on the number of frames in the video block, some of the later transform layers may use only the T1 decomposition filter if the total number of coefficients being generated for that layer is four or less. For example, when the video block contains sixteen frames, the third transform layer uses only the T1 decomposition filter.

After applying the temporal decomposition transform to a predefined set of the lowest frequency subbands, the resulting transform coefficients are preferably quantized to improve data compression. The resulting coefficient values are then encoded using a sparse data encoder. In applications where image quality is paramount, the decomposition coefficients generated by the temporal decomposition transform are either not quantized, or are quantized using a smaller quantization factor than used for lower image quality applications.

Figure 10:
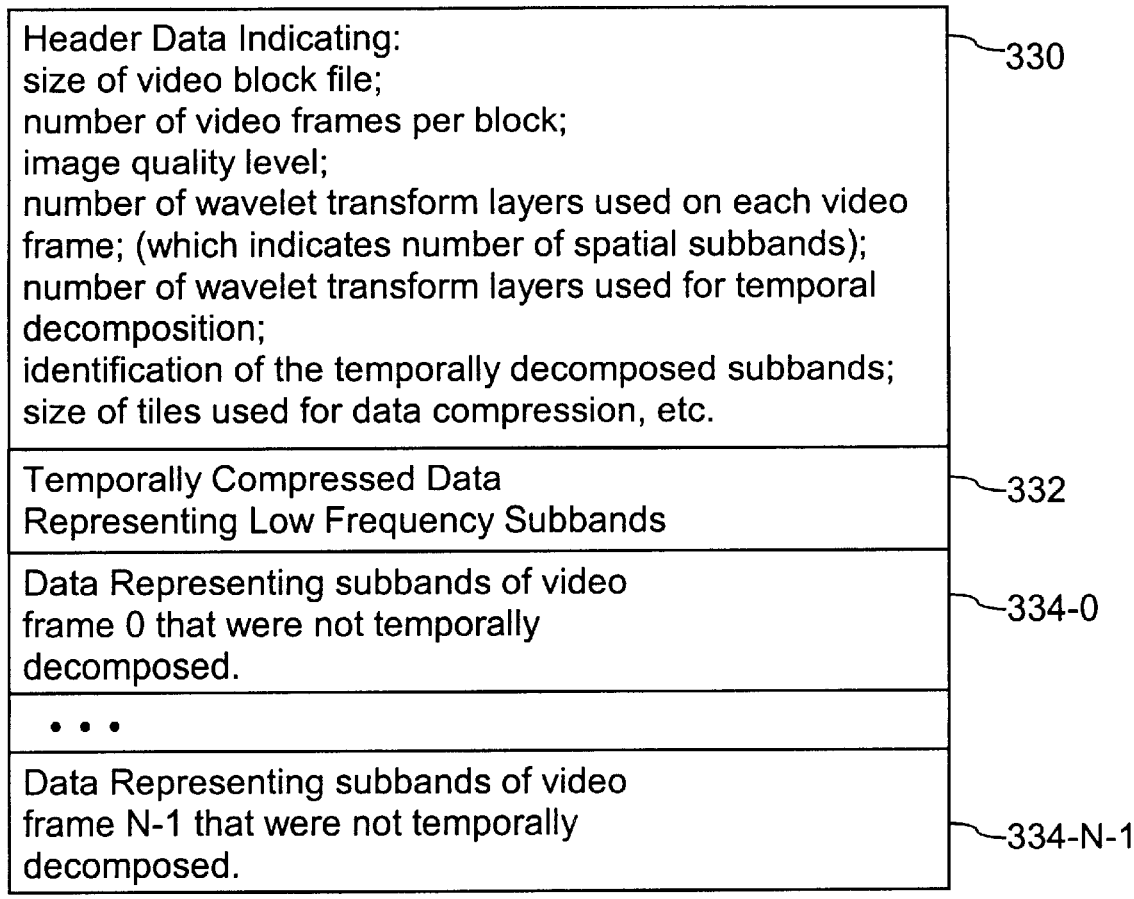
FIG. 10 depicts a data structure for storing a compressed block of video frames.

Referring to FIG. 10, in a preferred embodiment, the file or data structure used to store a compressed video block includes a header 330, temporally compressed data 332 representing the low frequency subbands to which the temporal decomposition transform was applied, and arrays 334-0 to 334-N-1 containing the subbands of compressed video data to which the temporal decomposition transform was not applied. The later arrays 334 will typically include a separate array for each frame in the video block. The header 330 preferably contains information about the length of the file, the number of video frames per block (if the number of frames per block is variable), an image quality level indicator, the number of wavelet transform layers used on each video frame (which indicates the number of spatial subbands), the number of wavelet transform layers used for temporal decomposition, identification of the subbands to which the temporal decomposition transform was applied, and the size of the tiles used for performing sparse data encoding. The image quality level indicator preferably indicates the quantization factors used for quantizing the spatial transform coefficients and temporal transform coefficients.

Figure 11:
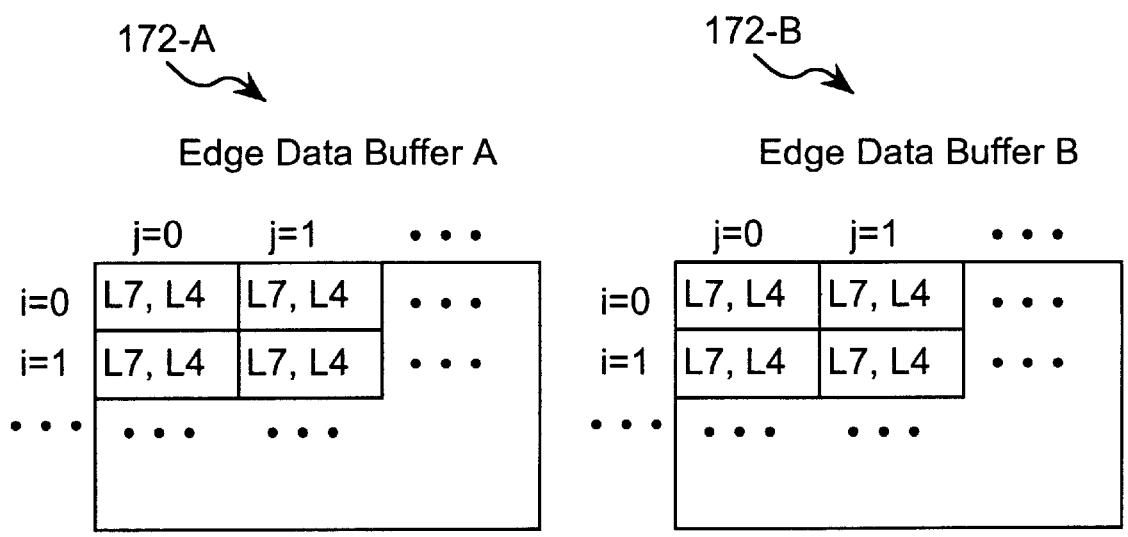
FIG. 11 depicts a pair of edge data buffer data structures for storing edge coefficients from one block of video frames and used while performing a temporal decomposition of a next block of video frames.

Referring to FIG. 11, in a preferred embodiment, two edge data buffers 172-A and 172-B are used. Each buffer stores two or more edge coefficient values for each (i,j) position in the video frames.

Video Frame Reconstruction

Figure 12:
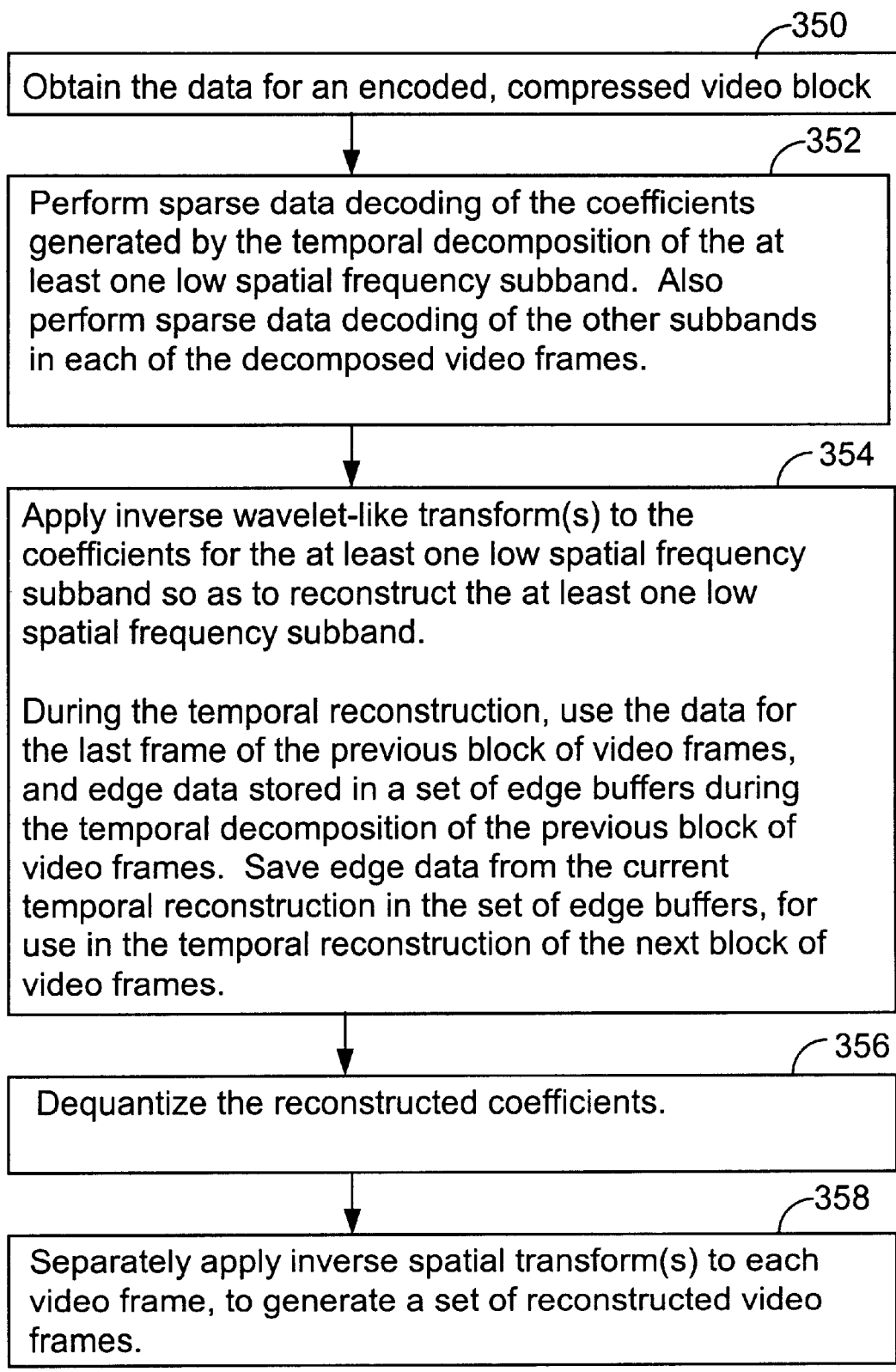
FIG. 12 is a flow chart of a temporal and spatial and temporal inverse transform process for reconstructing a compressed block of video frames in accordance with the present invention.

Referring to FIG. 12, to reconstruct a block of video frames, a sparse data decoding is performed on the encoded, compressed video file(s) (steps 350, 352). This reconstructs the coefficients generated by the temporal decomposition on the at least one low spatial frequency subband, and the other subbands in each of the decomposed video frames. If the image quality level indicator in the received video data indicates that the temporal transform coefficients were quantized, then the reconstructed temporal transform coefficients are dequantized prior to applying an inverse transform to those coefficients.

Next, a temporal reconstruction is performed by applying inverse wavelet-like transform(s) to compressed data (i.e., coefficients) representing the at least one low spatial frequency subband (step 354). This reconstructs the at least one low spatial frequency subband. During the temporal reconstruction, the inverse transform is applied to both the temporal decomposition coefficients for the current frame and temporal decomposition coefficients for the last frame of the previous block of video frames. Edge data stored in a set of edge buffers during the temporal decomposition of the previous block of video frames is used for the inverse transform layers other than the first inverse transform layer. Edge data from the current temporal reconstruction is stored in the set of edge buffers, for use in the temporal reconstruction of the next block of video frames.

After the temporal reconstruction, the resulting decompressed coefficients (as well as the coefficients in the subbands that were not the subject of the temporal decomposition and reconstruction, are dequantized so as to reconstruct all the subbands of decomposition coefficients for all the video frames in the current block (step 356). Finally, an inverse spatial transform is applied to all the subbands of each video frame so as to regenerate the individual video frames of the block (step 358).

The wavelet-like inverse temporal transform for reconstructing the temporally compressed subbands from the dequantized temporal transform coefficients is defined as follows. A first filter, T1-R, is used to reconstruct the first two and last three data values in the row of transform coefficients being reconstructed, and a second filter T2-R, is used to generate all the other data values in the row of transform coefficients being reconstructed.

The T1 and T2 reconstruction filters are defined as follows:

T1-R RECONSTRUCTION TRANSFORM
(ShortFilter)

$$x_{2i+1} = \tilde{x}_{2i+1} - \frac{\tilde{x}_{2i+2} + \tilde{x}_{2i}}{4} \quad \text{Odd Position(s)}$$

$$x_{2i+1} = \tilde{x}_{2i+1} - \frac{\tilde{x}_{2i}}{4} \quad \text{Last } x_{2i+1} \text{ Position only}$$

$$x_{2i} = \tilde{x}_{2i} + \frac{x_{2i-1} + x_{2i+1}}{2} \quad \text{Even Position(s)}$$

T2-R RECONSTRUCTION TRANSFORM
(LongFilter)

$$x_{2i+1} = \tilde{x}_{2i+1} - \frac{\tilde{x}_{2i+2} + \tilde{x}_{2i}}{4} - \frac{(\tilde{x}_{2i} + \tilde{x}_{2i+2}) - (\tilde{x}_{2i-2} + \tilde{x}_{2i+4})}{32} \quad \text{Odd Positions}$$

$$x_{2i} = \tilde{x}_{2i} + \frac{x_{2i-1} + x_{2i+1}}{2} + \frac{(x_{2i-1} + x_{2i+1}) - (x_{2i-3} + x_{2i+3})}{16} \quad \text{Even Positions}$$

During each layer of the reconstruction process, the data values at odd positions (i.e., the $x_{2i+1}$ values) must be computed before the data values at the even positions (i.e., the $x_{2i}$ values).

Thus, in general, the video frame reconstruction process for each block of video frames, other than the first block of video frames processed, uses sets of edge coefficients generated while processing the previous block of video frames.

In a preferred embodiment, the same T1-R and T2-R reconstruction transforms are used in the inverse spatial transform step (358, FIG. 12) to reconstruct the image data in the individual video frames from the spatial decomposition coefficients.

Sparse Data Encoding Using Nested Quadratic Splitting

The NQS encoder is used to efficiently encode a block of data. The block is typically a rectangular block of transform coefficients.

Figure 13A:
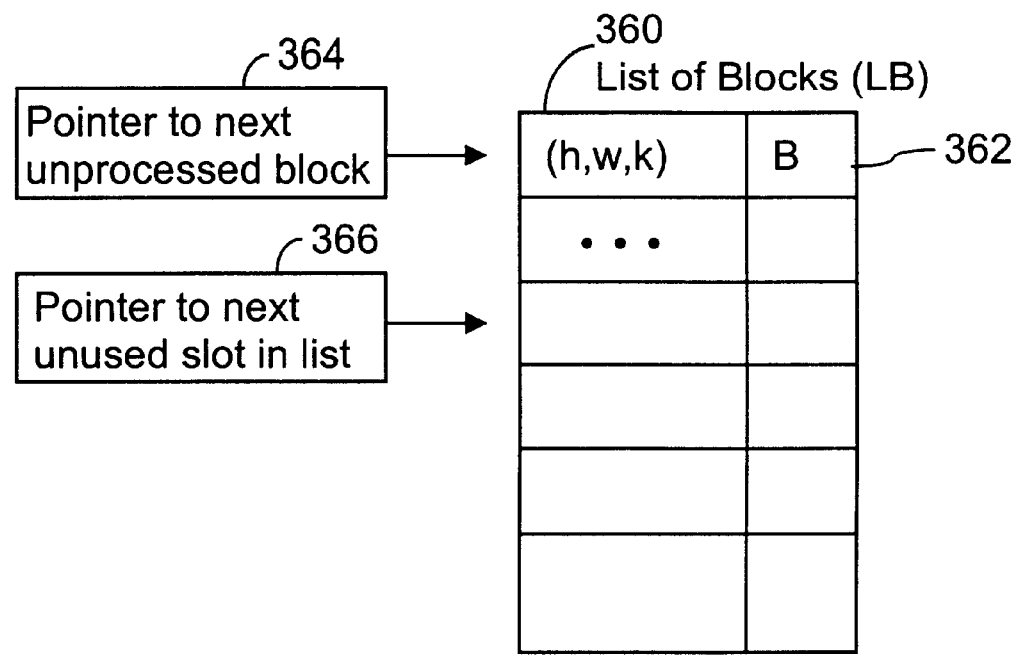
FIGS. 13A and 13B depict data structures used in a preferred implementation of a "nested quadratic splitting" (NQS) data encoding method.

Referring to FIG. 13A, the main "bookkeeping" data structure used by the NQS encoder and decoder procedures in a preferred embodiment is a block list data structure 360, which lists data blocks (i.e., subarrays of data) to be processed. The block list 360 contains an entry 362 for each block on the list of blocks. The entry 366 for each data block includes (A) a block identifier, which indicates the origin of the data block and the height and width of the data block, and (B) a value indicating the maximum number of bits required to represent any data value in the data block (i.e., $int(1+\log_2 V)$, where V is the largest data value in the data block and int(x) is the integer portion of x). In addition, the list 360 has a first pointer 364 that points to the block highest in the list 360 that has not yet been processed, and a second pointer 266 that points to the highest unused slot in the list 360.

Table 1 provides definitions of terms and abbreviations used in the flow chart FIGS. 14–17.

TABLE 1

| | |
|---|---|
| Definitions of Terms used in Flow Chart FIGS. | |
| node | a single particular position in a data array |
| (h,w,k) | this represents a data block whose origin is at y,x = (h,w) and that extends vertically and horizontally $2^k$ positions. |
| V(h,w,k) | Maximum value of all nodes in the (h,w,k) block |
| LB | List of blocks data structure |
| V(i,j) | the value of the (i,j) node |
| MaxBit(h,w,k) | the maximum number of bits required to encode the absolute value of any data value in the block (i.e., int(1 + log2V)) |
| (h,w,k)'s subblocks | (h,w,k − 1), (h,w + $2^{k-1}$,k − 1), (h + $2^{k-1}$,w, k − 1), (h + $2^{k-1}$,w + $2^{k-1}$,k − 1) |
| nodes of (h,w,1) | (h,w), (h,w + 1), (h + 1,w) (h + 1,w + 1) |

Figure 13B:
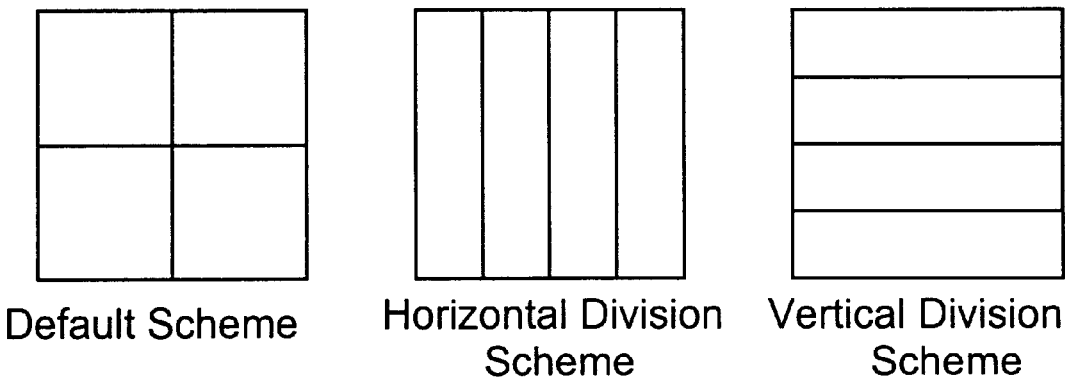

Referring to FIG. 13B, during the encoding of a block of data, the block is divided into subblocks. In the preferred embodiments, the block is a square that is divided into four equal size subblocks, which are also squares. However, in other embodiments, the block could be divided otherwise, such as into four vertically or horizontally oriented rectangles.

Figure 14:
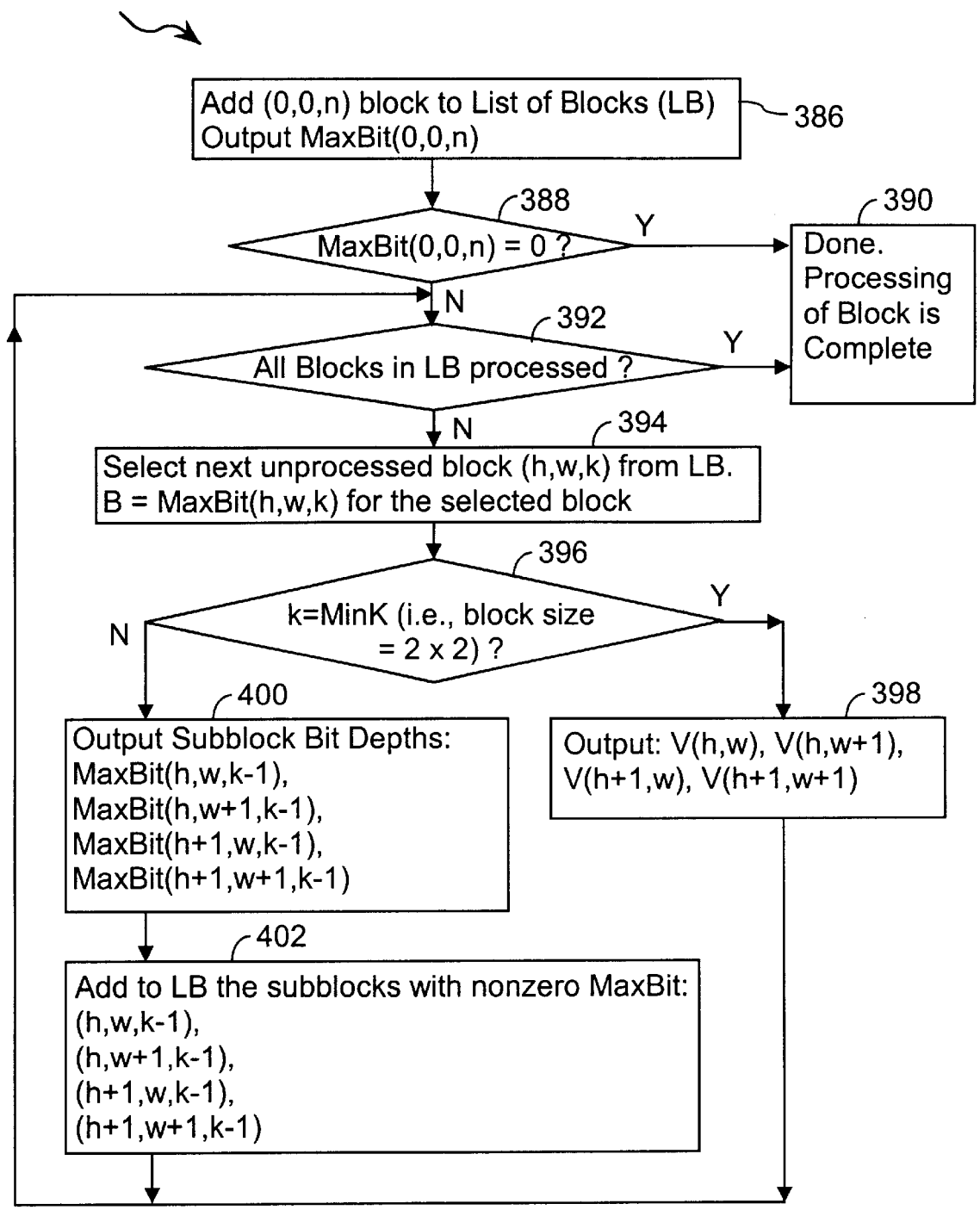
FIG. 14 is a flow chart of a method of encoding a block of an image using a "nested quadratic splitting" (NQS) data encoding method.

Referring to FIG. 14, a first entry, representing an entire block of data, is put in the list of blocks (386). The block may be an entire subband of transform coefficients, or it may be a portion of the subband, such as a 32×32 block or 64×64 block of the transform coefficients within a particular subband. The list of blocks is empty except for this first entry. Also, at step 386 the encoding procedure determines and outputs the value of MaxBit(0,0,n), which is equal to the maximum number of bits required to encode any data value in the entire array being analyzed, and outputs that value using a predefined number of bits (e.g., 4 bits, since the maximum bit depth using conventional color palettes is eight bits). The "MaxBit" of a data array is sometimes called the bit depth of the array. If MaxBit(0,0,n) is equal to zero (388-Yes), that indicates that all the nodes in the array to be encoded are equal to zero, and therefore the encoding procedure is complete (390). In other words, the entire block contains entries of just one value, and is represented by the MaxBit(0,0,n) value.

If the block contains at least one nonzero value (388-No), and at least one block listed in the block list has not yet been processed (392-No), which is normally the case at the beginning of the NQS encoding procedure, the procedure selects the next unprocessed data block (h,w,k) from the block list and sets a variable B equal to the maximum number of bits required to encode any data value in the selected data block (394).

If the size of the selected data block, as represented by the "k" parameter in the (h,w,k) block identifier, is equal to a predefined minimum block size such as 2×2 (396-Yes), the procedure outputs the values of all the pixels in the block (398). Each pixel value is output using B bits, where B is the number of bits denoted in the block list for this block, and is equal to the maximum number of bits (MaxBit) used by any data value in the selected block.

In an alternate embodiment, the minimum block size may be larger than 2×2; for instance a minimum block size of 4×4 could be used. However, in general, using a larger minimum block size will, on average, result in larger encoded files.

If the size of the selected data block, as represented by the "k" parameter in the (h,w,k) block identifier, is not equal to or smaller than the predefined minimum block size (396-No), the procedure outputs (400) a set of four bit depth values representing the maximum number of bits required to encode each of the four subblocks of the selected block. These four bit depth values are MaxBit(h,w,k−1), MaxBit (h,w+1,k−1), MaxBit(h+1,w,k−1), and MaxBit(h+1,w+1,k−1).

The bit depth values are preferably encoded efficiently, for example by using "differential encoding." Differential encoding, in this instance, means encoding the difference between the maximum number of bits, B, for the current block B and the maximum number of bits needed for each of the subblocks. It is noted that, by definition, at least one of the subblocks will have the same maximum number of bits (i.e., bit depth) as the current block, and thus the differential value to be encoded will be zero for those subblocks having the same bit depth as the current block. In addition, the procedure adds each of the subblocks having a non-zero bit depth to the list of blocks LB (402). Step 400 is shown in more detail in FIG. 15.

Referring to FIG. 15, in a preferred embodiment the differential bit depth value for each subblock is encoded as follows. The variable b is set equal to the maximum number of bits required to encode any data value in the subblock. If b=0, that means that all values in the subblock are equal to zero, in which case a value of 0 is output using B bits. (B is the maximum number of bits required to encode any data value in the parent, i.e., current, data block.) Otherwise, if b is not equal to 0, then (A) a value of 0 is output using B-b bits, and (B) a value of 1 is output using 1 bit. In other words, the value b is encoded as B-b "0" bits followed by a "1" bit. For example, if B=6 and b=4, then the differential bit depth is represented by the string "001". In another example, if B=6 and b=6, the differential bit depth is represented by the string "1". In an alternate embodiment, each differential bit depth value B-b may be encoded using a fixed-table Huffman coding method. In other alternate embodiments, other methods may be used to efficiently represent the bit depth values of the four subblocks.

Referring again to FIG. 14, after the current block has been processed, either by outputting its pixel values (398) or by outputting the bit depths of its subblocks and adding the subblocks to the list of blocks (400, 402), the pointer 364 (FIG. 6A) to the next block will be advanced by one position at step 394 if there are any unprocessed data blocks left in the block list (392-No).

The above described procedure continues until all the blocks in the block list have been processed (392), at which point the encoding of the data analysis array is complete (390).

Alternate MaxBit Encoding (Step 400)

As described above, each block contains four subblocks. In an alternate embodiment that achieves better data compression than the Maxbit encoding method described above, step 400 of the encoding procedure determines the Maxbit for each of the four subblocks of the current block. Then, it generates and encodes a Maxbit mask. The mask has four bits: $m_1$, $m_2$, $m_3$ and $m_4$, each of which is set equal to a predefined value (e.g., 1) only if the Maxbit of the corresponding subblock is equal to the Maxbit $m_0$ of the current (parent) block, and is otherwise set to zero. The mathematical representation of the mask is as follows:

$$\text{mask} = (m_0=m_1)+(m_0=m_2)+(m_0=m_3)+(m_0=m_4)$$

where the "+" represents a concatenation operator. For example, a mask of 1000 indicates that only subblock 1 has a Maxbit equal to the Maxbit of the current block. The value of the mask is always between 1 and 15.

The Maxbit mask is preferably encoded using a 15-symbol Huffman table (see Table 2). As can be seen, the four mask values that correspond to the most common mask patterns, where just one subblock having a Maxbit equal to the Maxbit of the parent block, are encoded with just three bits.

TABLE 2

Huffman Table for Encoding Maxbit Mask

| Mask | Huffman Code |
| --- | --- |
| 0001 | 111 |
| 0010 | 101 |
| 0011 | 1001 |
| 0100 | 011 |
| 0101 | 0010 |
| 0110 | 10000 |
| 0111 | 01001 |
| 1000 | 110 |
| 1001 | 01000 |
| 1010 | 0001 |
| 1011 | 00110 |
| 1100 | 0101 |
| 1101 | 00111 |
| 1110 | 0000 |
| 1111 | 10001 |

Encoding Subblock Maxbit Values

In addition, step 400 includes encoding the Maxbit value for each of the subblocks whose Maxbit is not equal to the Maxbit $m_0$ of the current block. For instance, if the Maxbit values for the current block are $m_1$, $m_2$, $m_3$, $m_4$=5, 0, 3, 2 then the only Maxbit values that need to be encoded are $m_2$, $m_3$ and $m_4$, because the Maxbit value of $m_1$ is known from the Maxbit mask and the previous stored and encoded value of the Maxbit $m_0$ of the current block.

It should be noted that if $m_0=1$, then there is no need to encode the Maxbit values of the subblocks, because those values are known completely from the Maxbit mask.

If $m_0 16\ 1$, then for each $m_i \neq m_0$, the procedure encodes the value $m_i$ as follows:

$m_i=0$, then the outputs a string of 0's of length $m_0-1$; and otherwise, the procedure outputs a string of 0's of length $m_0-m_i-1$ followed by a 1.

For instance, if $m_0=5$, and $m_1=0$, then $m_1$ is encoded as a string of four 0's: 0000. If $m_0=5$, and $m_2=3$, then $m_2$ is encoded as a string of (5−3−1=1) one 0 followed by a 1:01.

In our example of $\{m_1, m_2, m_3, m_4\}=\{5, 0, 3, 2\}$, the Maxbit values are encoded as follows:

| mask | $m_2$ Subblock | $m_3$ Subblock | $m_4$ Subblock |
| --- | --- | --- | --- |
| 111 | 0000 | 01 | 001 |

Nested Quadratic Splitting Decoding Procedure

Referring to FIGS. 17 and 18, the NQS decoder procedure 420 works, in general, by reading and interpreting the encoded data so as to reverse the process performed by the NQS encoder procedure 168. The bits of the encoded data are read, in order, in a single pass from the first bit to the last. When the last data bit in the encoded data has been processed, reconstruction of the encoded block is complete.

As the encoded data is read, entries are added to the block list to identify the data blocks and subblocks that will be processed later in the procedure, along with the data indicating the maximum number of bits needed to encode the data in those blocks and subblocks. Data blocks and subblocks are analyzed in the order they appear in the encoded data. Whenever a subblock is processed, if the subblock is entirely filled with zero data (i.e., its data values all equal to zero), the relevant portion of the reconstructed data array is filled with zero data values. Otherwise, subblock identifiers are added to the block list until subblocks whose size is the minimum block size (e.g., 2×2) are encountered, at which point the four values in the subblock are decoded and output to the reconstructed data array.

Figure 16:
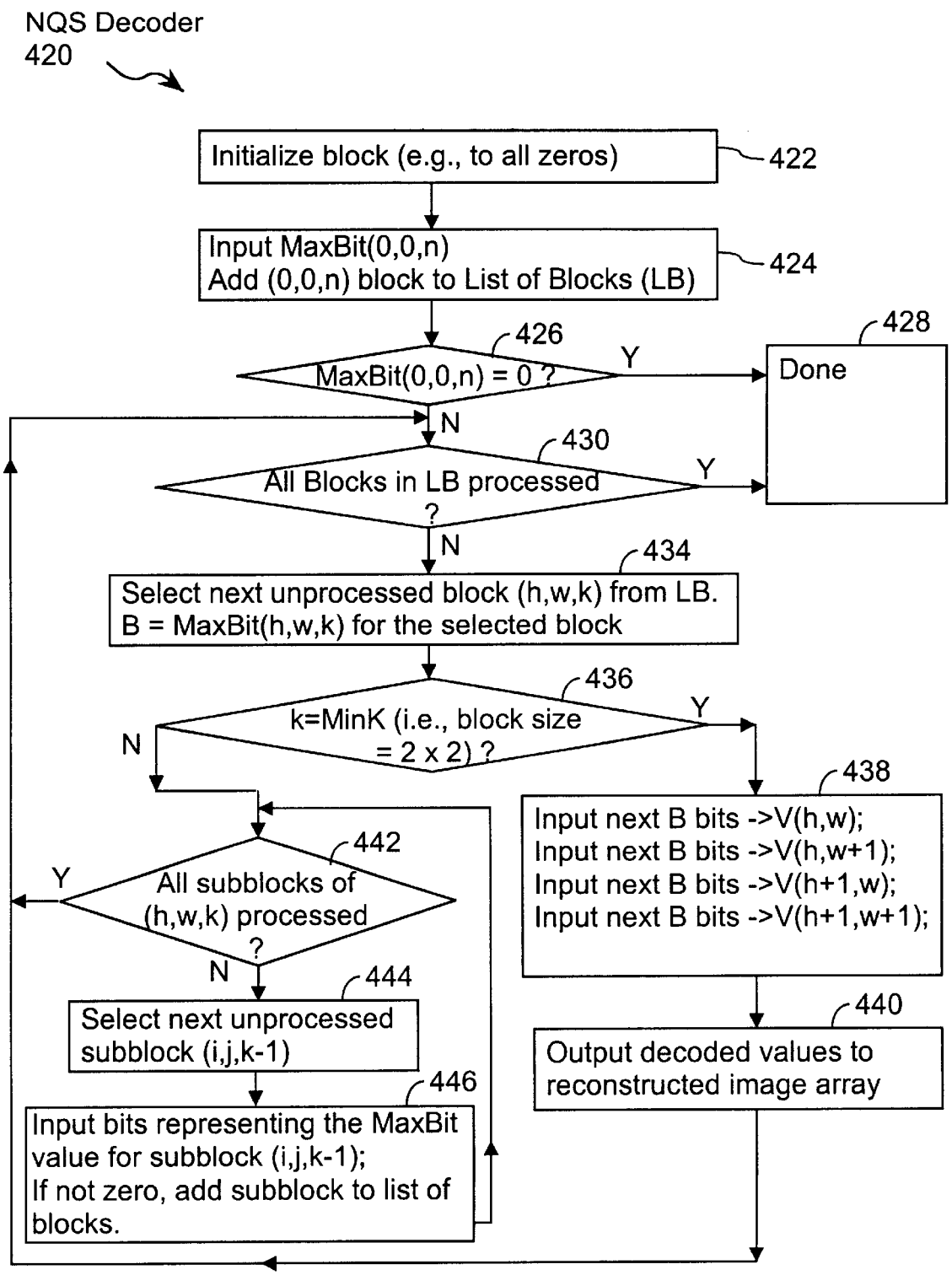
FIG. 16 is a flow chart of a preferred implementation of a method of decoding an image block that has been encoded using the pixel value remapping and NQS data encoding method of the present invention.

Referring to FIG. 16, the decoder procedure begins by initializing the data array for the block (herein called the block array or the reconstructed data array) (422), for instance to all zero values. It is assumed that the coding type identifier was read prior to executing the decoding procedure, since the decoder procedure is selected on the basis of the coding type identifier at the beginning of the block data structure or file.

Next, the procedure reads the bit depth value of the block, MaxBit(0,0,n), from the block data structure or file and puts a first entry, representing the block, in the list of blocks (424). The list of blocks is empty except for this first entry. The first entry in the list of blocks specifies the bit depth value for the block. If the bit depth of the block is equal to zero (426-Yes), that indicates that all the nodes in the array to be decoded are equal to zero, and therefore the NQS decoding of the block is complete (428).

If at least one block listed in the block list has not yet been processed (430-No), which is generally the case at the beginning of the decoder procedure, the procedure selects the next unprocessed block (h,w,k) from the block list and reads from the block list a value B equal to the bit depth of the block (434).

If the size of the selected block is the predefined minimum block size, such as 2×2 (436-Yes), the decoder procedure inputs and decodes the bits representing all the pixels of the block (438), each of which is represented by a set of B bits, where B is the bit depth of the block. The resulted decoded pixel values are output to the reconstructed block array (440).

If the size of the selected block is not the predefined minimum block size (436-No), the following steps are performed for each of the four subblocks of the selected block. Steps 442 and 444 are used to select each successive subblock and to exit the loop when all four subblocks have been processed. For each subblock, the bits representing the bit depth of the subblock are read and decoded (446). As shown in FIG. 17, in a preferred embodiment, the bit depth decoding (446) for each subblock is accomplished by reading the encoded data bits until either a 1 bit is encountered or B bits are read without reading a 1 bit. The variable "repeat-times" keeps track of how many 0 bits have been read. If a 1 bit is read before repeat-times reaches a value of B, the subblock is added to the block list and a value of "B—repeat-times" is stored in the block list for the subblock, representing the maximum number of data bits used to encode the data in the subblock. If B zero bits are read, then the subblock contains only zero data and no entries are added to the block list. Note that no data values are written to the reconstructed data array in step 446 because there is no need to write zero data values to the reconstructed data array (see step 422 in FIG. 16). Steps 442, 444 and 446 (FIG. 16) are repeated until all four subblocks of the selected data block have been processed. Then the pointer 364 (FIG. 13A) to the next processed block is advanced by one position at step 434 if there are any unprocessed data blocks left in the list of blocks (430-No).

The above described procedure continues until all the blocks in the list of blocks have been processed (430-Yes), at which point the procedure is complete.

Alternate Embodiments

In an alternate embodiment, some or all of the transform filters could overlap the video frame boundary by two or three samples, instead of by just one sample.

In another alternate embodiment, a different transform than the wavelet-like transform described above could be used for the temporal decomposition and temporal reconstruction transforms.

The present invention can be implemented as a computer program product that includes a computer program mechanism embedded in a computer readable storage medium. For instance, the computer program product could contain the program modules shown in FIGS. 1 and 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An video data processing system, comprising:

apparatus for providing a sequence of video frames, each video frame containing an array of image data representing an image;

a spatial transform module for performing a spatial decomposition transform on the video frames to generate spatially transformed video frames; each of the spatially transformed video frames including a plurality of subbands of data, including at least one low spatial frequency subband of data; and memory for storing the spatially transformed video frames;

a temporal transform module for performing a temporal decomposition transform on blocks of the spatially transformed video frames, each block containing a predefined number of the spatially transformed video frames in a sequence corresponding to the sequence of the corresponding video frames, the temporal transform module applying a temporal decomposition transform to the at least one low spatial frequency subband of data in the spatially transformed video frames so as to generate temporally transformed video data for the at least one low spatial frequency subband of data in the spatially transformed video frames; and a data encoder for encoding, for each block of video frames, the temporally transformed video data and the subbands of data, if any, of the spatially transformed video frames in the block to which the temporal decomposition transform was not applied.

2. The image processing system of claim 1, wherein the temporal decomposition transform is an asymmetric transform that extends beyond a current block of spatially transformed video frames to a trailing edge of a previous block of spatially transformed video frames but does not extend beyond the current block of spatially transformed video frames to a next block of spatially transformed video frames.

3. The image processing system of claim 2, wherein the temporal decomposition transform is a wavelet or wavelet-like decomposition transform.

4. The image processing system of claim 2, wherein the at least one low spatial frequency subband includes, for each video frame, a plurality of coefficients at positions (i,j);

the temporal decomposition transform includes a plurality of transform layers, including first, second and last transform layers, each of the plurality of transform layers other than the last transform layer producing intermediate coefficients for input to a next transform layer;

the system includes an edge data buffer for storing, for each coefficient in the at least one low spatial frequency subband, at least one intermediate coefficient generated by the temporal decomposition transform when applied to the previous block of video frames; and the temporal transform module is configured to use the at least one intermediate coefficient stored in the edge buffer for each coefficient in the at least one low spatial frequency subband as input to at least one of the transform layers of the temporal decomposition transform when the temporal decomposition transform is applied to the current block of video frames.

5. The image processing system of claim 2, wherein the spatial decomposition transform is a discrete cosine transform.

6. A method of processing a sequence of video frames, comprising:

performing a spatial decomposition transform on the video frames to generate spatially transformed video frames; each of the spatially transformed video frames including a plurality of subbands of data, including at least one low spatial frequency subband of data; and storing the spatially transformed video frames;

performing a temporal decomposition transform on blocks of the spatially transformed video frames, each block containing a predefined number of the spatially transformed video frames in a sequence corresponding to the sequence of the corresponding video frames, including applying a temporal decomposition transform to the at least one low spatial frequency subband of data in the spatially transformed video frames so as to generate temporally transformed video data for the at least one low spatial frequency subband of data in the spatially transformed video frames; and encoding, for each block of video frames, the temporally transformed video data and the subbands of data, if any, of the spatially transformed video frames in the block to which the temporal decomposition transform was not applied.

7. The method of claim 6, wherein the temporal decomposition transform is an asymmetric transform that extends beyond a current block of spatially transformed video frames to a trailing edge of a previous block of spatially transformed video frames but does not extend beyond the current block of spatially transformed video frames to a next block of spatially transformed video frames.

8. The method of claim 7, wherein the temporal decomposition transform is a wavelet or wavelet-like decomposition transform.

9. The method of claim 7, wherein the at least one low spatial frequency subband includes, for each video frame, a plurality of coefficients at positions (i,j);

the temporal decomposition transform includes a plurality of transform layers, including first, second and last transform layers, each of the plurality of transform layers other than the last transform layer producing intermediate coefficients for input to a next transform layer;

the performing a temporal decomposition transform includes storing, for each coefficient in the at least one low spatial frequency subband, at least one intermediate coefficient generated by the temporal decomposition transform when applied to the previous block of video frames; and the performing a temporal decomposition transform includes using the at least one intermediate coefficient stored in the edge buffer for each coefficient in the at least one low spatial frequency subband as input to at least one of the transform layers of the temporal decomposition transform when the temporal decomposition transform is applied to the current block of video frames.

10. The method of claim 7, wherein the spatial decomposition transform is a discrete cosine transform.

11. A computer program product for use in conjunction with a computer system, the computer program product comprising a computer readable storage medium and a computer program mechanism embedded therein, the computer program mechanism comprising:

a spatial transform module for performing a spatial decomposition transform on the video frames to generate spatially transformed video frames; each of the spatially transformed video frames including a plurality of subbands of data, including at least one low spatial frequency subband of data; and a temporal transform module for performing a temporal decomposition transform on blocks of the spatially transformed video frames, each block containing a predefined number of the spatially transformed video frames in a sequence corresponding to the sequence of the corresponding video frames, the temporal transform module applying a temporal decomposition transform to the at least one low spatial frequency subband of data in the spatially transformed video frames so as to generate temporally transformed video data for the at least one low spatial frequency subband of data in the spatially transformed video frames; and a data encoding module for encoding, for each block of video frames, the temporally transformed video data and the subbands of data, if any, of the spatially transformed video frames in the block to which the temporal decomposition transform was not applied.

12. The computer program product of claim 11, wherein the temporal decomposition transform is an asymmetric transform that extends beyond a current block of spatially transformed video frames to a trailing edge of a previous block of spatially transformed video frames but does not extend beyond the current block of spatially transformed video frames to a next block of spatially transformed video frames.

13. The computer program product of claim 12, wherein the temporal decomposition transform is a wavelet or wavelet-like decomposition transform.

14. The computer program product of claim 12, wherein the at least one low spatial frequency subband includes, for each video frame, a plurality of coefficients at positions (i,j);

the temporal decomposition transform includes a plurality of transform layers, including first, second and last transform layers, each of the plurality of transform layers other than the last transform layer producing intermediate coefficients for input to a next transform layer;

the system includes an edge data buffer for storing, for each coefficient in the at least one low spatial frequency subband, at least one intermediate coefficient generated by the temporal decomposition transform when applied to the previous block of video frames; and the temporal transform module is configured to use the at least one intermediate coefficient stored in the edge buffer for each coefficient in the at least one low spatial frequency subband as input to at least one of the transform layers of the temporal decomposition transform when the temporal decomposition transform is applied to the current block of video frames.

15. The computer program product of claim 12, wherein the spatial decomposition transform is a discrete cosine transform.

* * * * *